United States Patent [19]
Kobayashi et al.

[11] 3,838,325
[45] Sept. 24, 1974

[54] MOTOR SPEED ACCELERATION-DECELERATION CONTROL CIRCUIT

[76] Inventors: Kengo Kobayashi, No. 2937, Sugao, Tama-ku, Kawasaki-shi; Mitsuo Manabe, No. 3-17-17, Minamimachi, Kichijoji, Musashino-shi, both of Japan

[22] Filed: Aug. 30, 1973

[21] Appl. No.: 393,048

[52] U.S. Cl.................. 318/415, 318/318, 318/341
[51] Int. Cl. ............................................. H02p 5/16
[58] Field of Search .......... 318/314, 318, 341, 404, 318/415, 416

[56] References Cited
UNITED STATES PATENTS

| | | | |
|---|---|---|---|
| 3,564,368 | 2/1971 | Kelling | 318/314 |
| 3,579,279 | 5/1971 | Inaba | 318/415 |
| 3,628,114 | 12/1971 | Pattantyus | 318/314 |
| 3,724,720 | 4/1973 | Bullivant | 318/318 |

Primary Examiner—Robert K. Schaefer
Assistant Examiner—Thomas Langer
Attorney, Agent, or Firm—Daniel Jay Tick

[57] ABSTRACT

A motor speed acceleration-deceleration control circuit capable of controlling by smoothing pulse trains the accelerating and decelerating characteristics of the pulse trains in any mode of exponential, linear and/or changing from linear to exponential and simultaneously capable of exponentially controlling the accelerating characteristic and linearly controlling the decelerating characteristic comprises a first reversible counter which accumulates the command pulses. A second reversible counter reversibly counts pulses having a constant frequency. The reversible counting depends upon the output of a comparator which compares the contents in the first reversible counter with the contents of the second reversible counter. A pulse generator produces output pulses having a repetition frequency proportional to the contents of the second reversible counter. The output pulses are fed back negatively to the subtraction input of the first reversible counter.

12 Claims, 39 Drawing Figures

ACCUMULATED VALUE DURING ACCELERATION

ACCUMULATED VALUE DURING DECELERATION

OUTPUT PULSE FREQUENCY CHARACTERISTIC

ACCUMULATED VALUE OF COUNTERS

OUTPUT PULSE FREQUENCY CHARACTERISTIC

ACCUMULATED VALUE OF COUNTERS

OUTPUT PULSE FREQUENCY CHARACTERISTIC

ACCUMULATED VALUE OF COUNTERS

OUTPUT PULSE
FREQUENCY CHARACTERISTIC

ACCUMULATED VALUE
OF COUNTERS

OUTPUT PULSE
FREQUENCY CHARACTERISTIC

ACCUMULATED VALUE
OF COUNTERS

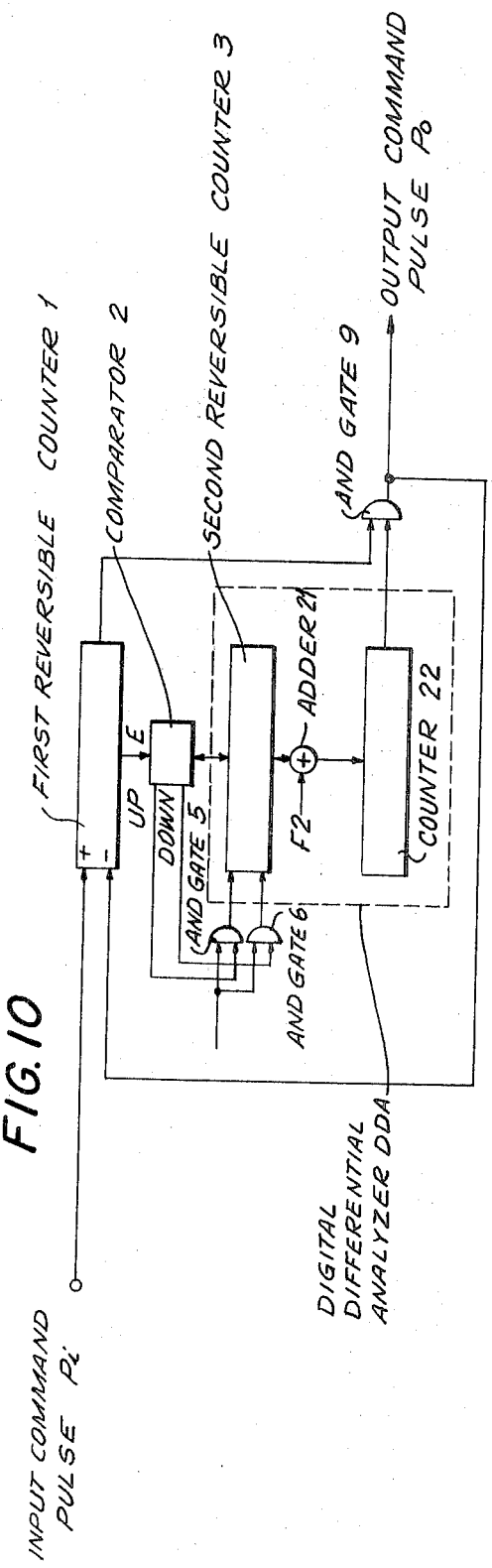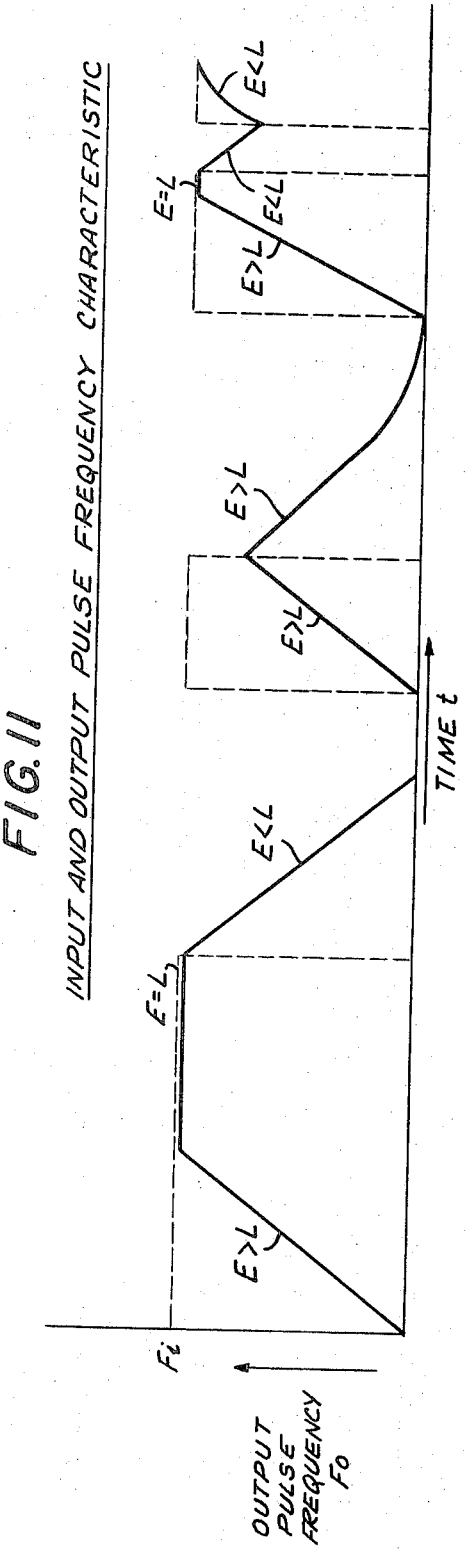
FIG.10
FIG.11 INPUT AND OUTPUT PULSE FREQUENCY CHARACTERISTIC

COMPARATOR

| INPUT (LOGIC) | | | | LOGICAL OUTPUT | | |
|---|---|---|---|---|---|---|
| A3, B3 | A2, B2 | A1, B1 | A0, B0 | A>B | A<B | A=B |
| A3>B3 | X | X | X | 1 | 0 | 0 |
| A3<B3 | X | X | X | 0 | 1 | 0 |
| A3=B3 | A2>B2 | X | X | 1 | 0 | 0 |
| A3=B3 | A2<B2 | X | X | 0 | 1 | 0 |
| A3=B3 | A2=B2 | A1<B1 | X | 0 | 1 | 0 |
| A3=B3 | A2=B2 | A1>B1 | X | 1 | 0 | 0 |
| A3=B3 | A2=B2 | A1=B1 | A0>B0 | 1 | 0 | 0 |
| A3=B3 | A2=B2 | A1=B1 | A0<B0 | 0 | 1 | 0 |
| A3=B3 | A2=B2 | A1=B1 | A0=B0 | 0 | 0 | 1 |

FREQUENCY COMPARATOR

OUTPUT PULSE FREQUENCY CHARACTERISTICS

ACCUMULATED VALUE OF COUNTERS

OUTPUT PULSE FREQUENCY CHARACTERISTIC

OUTPUT PULSE FREQUENCY CHARACTERISTIC

ACCUMULATED VALUE OF COUNTERS

ACCUMULATED VALUE OF COUNTERS

ACCUMULATED VALUE OF COUNTERS

OUTPUT PULSE FREQUENCY CHARACTERISTIC

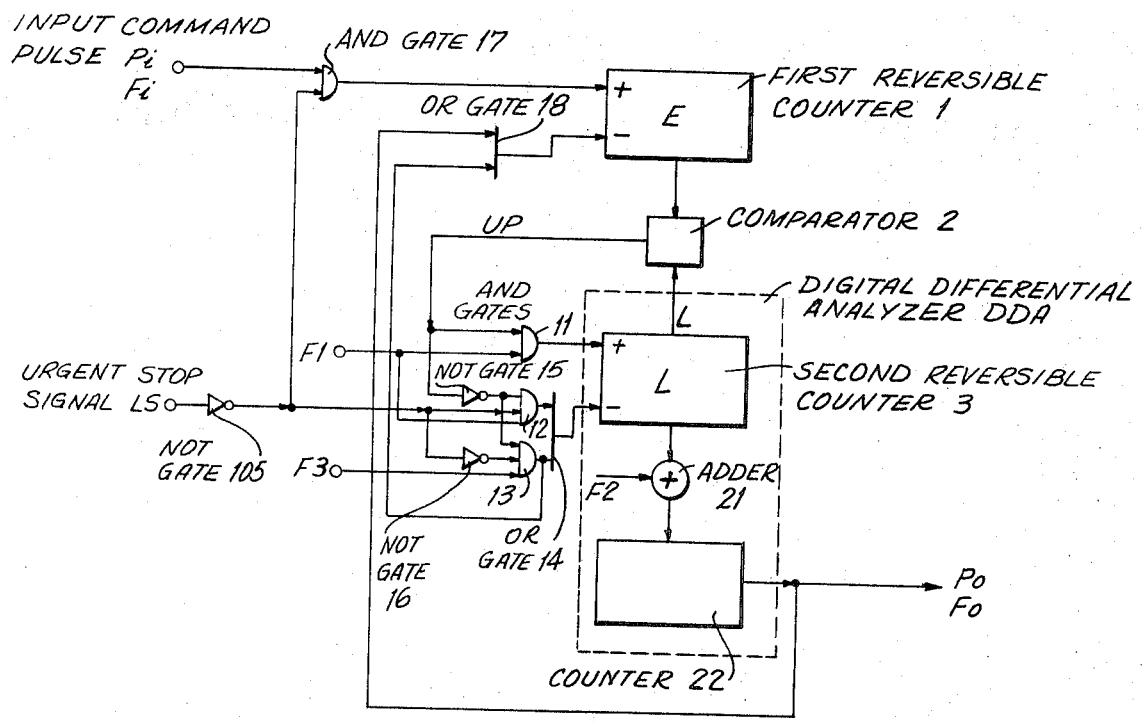
FIG. 21
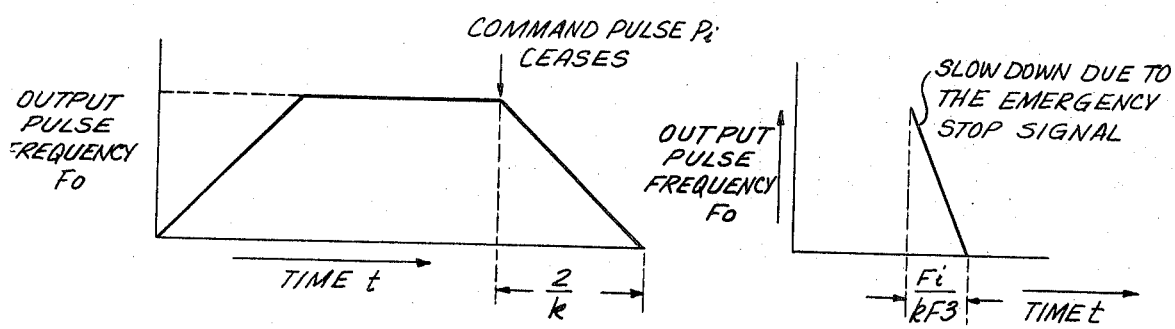
FIG. 22a
OUTPUT PULSE FREQUENCY CHARACTERISTIC
FIG. 22b
OUTPUT PULSE FREQUENCY CHARACTERISTIC

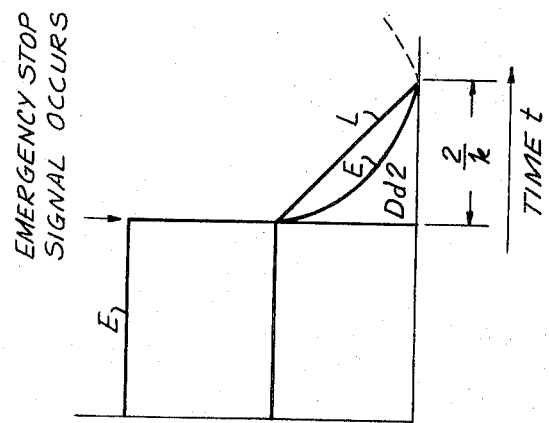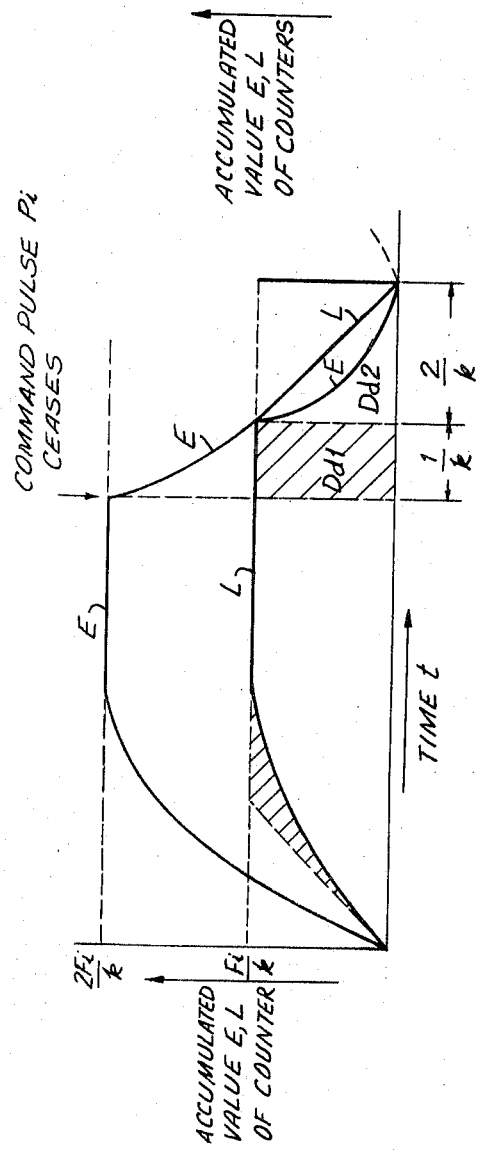

MOTOR SPEED ACCELERATION-DECELERATION CONTROL CIRCUIT

BACKGROUND OF THE INVENTION

The present invention relates to a motor speed control circuit. More particularly, the invention relates to a motor speed acceleration-deceleration control speed circuit.

Usually, a motor, during starting time, must gradually increase its speed of rotation up to the command speed. During deceleration time, the motor must gradually decrease its speed from the command speed in order to provide errorless starting and stopping. Furthermore, during the rotation of the motor it is necessary to smooth the command pulse train in case some pulses are missing. This is a necessity, because if the command pulse train is not complete, that is, if some pulses are missing, the motor rotation consequently loses smoothness, resulting in shocks being applied to the motor to some extent.

Various methods have been proposed for motor speed acceleration-deceleration control for the purpose of smoothing the command pulse train. The inventors have disclosed a motor speed acceleration-deceleration control for attaining the aforedescribed results in U.S. Pat. No. 3,624,517, issued Nov. 30, 1971 for "Circuit Arrangement for Making Spaces in a Pulse Train More Nearly Uniform". This motor speed acceleration-deceleration control system assures smooth rotation of the motor, even if some pulses are missing from the pulse train, and also assures the smooth rotation of the motor at the time of starting and stopping by obtaining the acceleration-deceleration characteristics of the pulse train in the exponential function mode.

The drawback of this system, however, is that an extended period of time is required until the motor speed reaches the command speed after starting, and until the motor stops after deceleration, because of the exponential acceleration-deceleration characteristics.

FOr this reason, if the aforedescribed motor speed control system is used, for example, as a motor speed control system for driving machine tools, the positioning time increases. This prevents high speed positioning. Thus, it is desirable to provide a motor speed control system with less acceleration-deceleration time which maintains smooth acceleration and deceleration.

BRIEF SUMMARY OF THE INVENTION

An object of the invention is to provide a motor speed acceleration-deceleration control circuit having a short acceleration-deceleration time, thereby eliminating the drawback in the conventional motor speed control systems.

Another object of the invention is to provide a motor speed control circuit in which the acceleration-deceleration time is decreased by obtaining linear acceleration-deceleration characteristics.

Still another object of the invention is to provide a motor speed acceleration-deceleration control circuit which varies the motor acceleration-deceleration characteristics in any modes of exponential function, linear and from linear to exponential function. Some types of motor cannot follow the linear acceleration-deceleration characteristics. In such a case, the acceleration and deceleration characteristics should be converted into that of the exponential function mode or that varying from the linear to the exponential function mode. The present invention readily and easily assures the conversion of the motor speed acceleration-deceleration characteristics.

Yet another object of the invention is to provide a motor speed acceleration-deceleration control circuit which provides an exponential function acceleration characteristic and linear deceleration characteristic. Since some types of motor cannot follow the linear acceleration characteristic, the motor speed should be controlled gradually by changing the acceleration characteristic into an exponential function in such cases.

Another object of the invention is to provide a motor speed acceleration-deceleration control circuit which easily and readily controls the acceleration-deceleration time of a motor when the motor acceleration and deceleration time must be changed, by means of mechanical load and inertia.

Still another object of the invention is to provide a motor speed acceleration-deceleration control circuit in which the motor deceleration time may be reduced by an instantaneous stop signal such as a stroke end signal for machine tools or an urgent stop signal.

BRIEF DESCRIPTION OF THE DRAWINGS

In order that the invention may be readily carried into effect, it will now be described with reference to the accompanying drawings, wherein:

FIG. 10 is a block diagram of still another embodiment of the motor speed acceleration-deceleration control circuit of the invention;

FIG. 11 is a graphical presentation of the input and output pulse frequency characteristic and the linear acceleration and deceleration characteristics of the motor speed acceleration-deceleration control circuit of FIG. 3;

FIG. 21 is a block diagram of an embodiment of the motor speed acceleration-deceleration control circuit of the invention for reducing the deceleration time by producing a stop signal such as a stroke end signal for a machine tool or an urgent stop signal;

FIGS. 22a and 22b are graphical presentations of the deceleration characteristic of the motor speed acceleration-deceleration control circuit of FIG. 21;

FIGS. 24a and 24b are graphical presentations of the accumulated value of counters of the motor speed acceleration-deceleration control circuit of FIG. 23.

In the FIGS., the same components are identified by the same reference numerals.

DETAILED DESCRIPTION OF THE INVENTION

Figure 1:
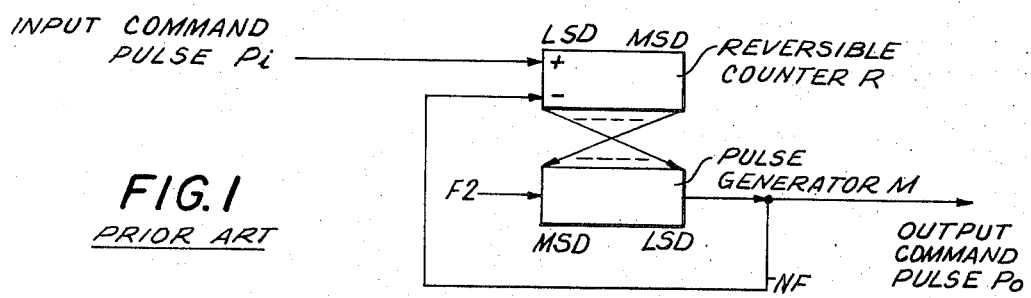
FIG. 1 is a block diagram of a known type of motor speed acceleration-deceleration control circuit.

FIG. 1 shows a known type of motor speed acceleration-deceleration control circuit and FIG. 2 shows the input and output pulse frequency characteristics of the motor speed acceleration-deceleration control circuit of FIG. 1.

The circuit of FIG. 1 comprises a reversible counter R which accumulates the command pulse $Pi$ every time it is generated by command pulse generating devices (not shown in the FIGS.). A well known MIT pulse generator or distributor M counts pulses having a constant frequency, supplied from the outside, and produces an output pulse $Po$ proportional to the contents of the reversible counter R. This is accomplished by multiplying the contents of the reversible counter R to the counted values. A negative feedback loop NF is provided for the feedback of the output pulse $Po$ to the subtraction inputs of the reversible counter R.

When the frequency or speed of the input command pulse $Pi$ is supposed to be $Fi$, the frequency or speed of the output pulse $Po$ is $Fo$, the contents of the reversible counter R is $r$ and the number of bits of the reversible counter is $n$, the following equation may be obtained.

$dr/dt = Fi - Fo$      1.

$Fo = F2 \cdot r/2^n$      2.

By substituting Equation (2) for $Fo$ in Equation (1), Equation (3) may be obtained.

$r = Fi/k \,(1 - \exp(-kt))$      3.

wherein $k = F2/2^n$

By substituting Equation (3) for $r$ in Equation (2), Equation (4) may be obtained.

$Fo = Fi(1 - \exp(-kt))$      4.

Figure 2A:
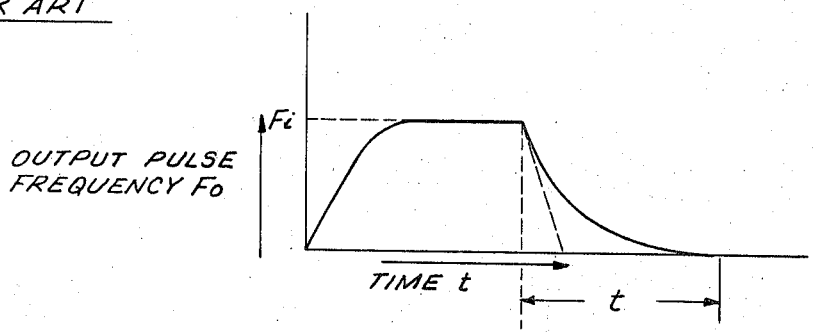
FIG. 2a is a graphical presentation of the output pulse frequency characteristic of the motor speed acceleration-deceleration control circuit of FIG. 1.
Figure 2B:
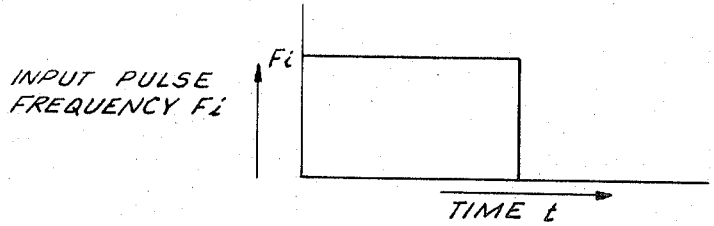
FIG. 2b is a graphical presentation of the input pulse frequency characteristic of the motor speed acceleration-deceleration control circuit of FIG. 1.

The output pulse frequency of the motor speed acceleration-deceleration control circuit of FIG. 1 increases in the exponential function shown in FIG. 2a. During the deceleration time, the output pulse frequency also decreases in exponential function, as mentioned. In FIG. 2a, the abscissa represents the time $t$ and the ordinate represents the output pulse frequency $Fo$ in pulses per second. In FIG. 2b, the abscissa represents the time $t$ and the ordinate represents the input pulse frequency $Fi$ in pulses per second.

FIG. 2b shows the input command pulse frequency. Therefore, the deceleration time from the instant the command pulse disappears until the output pulse speed becomes zero becomes larger than when it is decelerated linearly as shown by the broken line.

Figure 3:
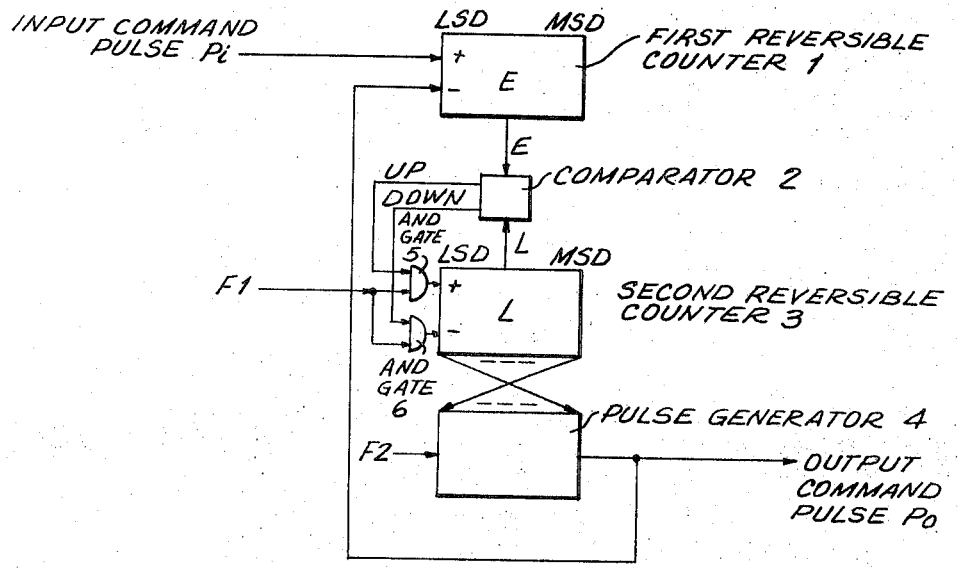
FIG. 3 is a block diagram of an embodiment of the motor speed acceleration-deceleration control circuit of the invention.

FIG. 3 shows an embodiment of the motor speed acceleration-deceleration control circuit of the invention. The control circuit of FIG. 3 comprises a first reversible counter 1 which accumulates the input command pulse $Pi$ each time it appears and carries out reverse counting or subtraction each time the output pulse $Po$ is provided. A second reversible counter 3 of $n$ bits counts a pulse F1 having a fixed frequency supplied from an external pulse generator (not shown in the FIGS.) reversibly in accordance with the output signals of AND gates 5 and 6. A comparator or discriminating circuit 2 compares the contents E of the first reversible counter 1 with the contents L of the second reversible counter 3. If E is larger than L, the comparator 2 sends a UP signal to the AND gate 5. If the contents E are smaller than the contents L, the comparator 2 sends a DWN signal to the AND gate 6.

The AND gate 5 adds one to the contents L of the second reversible counter 3 when the UP signal is logic "1" and a pulse of fixed frequency of F1 is supplied from outside. The AND gate 6 subtracts one from contents L of the second reversible counter 3 when the DWN signal is logic "1" and a pulse of fixed frequency is supplied from outside. A well known MIT pulse generator or distributor 4 counts pulses having a fixed frequency F2 supplied from outside and multiplies the counted value and the contents L of the second reversible counter 3 in order to produce an output command pulse $Po$ proportional to the contents L.

The relation between the contents L of the second reversible counter 3 and the frequency $Fo$ of the output command pulse $Po$ may be expressed as follows when it is assumed that the comparator 2 determines that L is smaller than E.

$Fo = F2 \cdot L(t)/2^n$
$= k \int F1 \, dt$
$= k \cdot F1 \cdot t$   5.

wherein $k = F2/2^n$

The contents E of the first reversible counter 1 may be expressed as follows when the input command pulse $Pi$ is supplied and it is assumed that the frequency of the input command pulse $Pi$ is $Fi$.

$E = \int Fi \, dt - \int Fo \, dt$
$= Fi \cdot t - \int k \cdot F1 \cdot t \, dt$
$= Fi \cdot t - k \cdot F1 \cdot t^2/2$
$= -\frac{1}{2} k \cdot F1 \, (t - Fi/k \cdot F1)^2 + \frac{1}{2} (Fi^2/k \, F1)$   6.

On the other hand, the contents L of the reversible counter 3 become as follows.
$L = \int F1 \, dt$
$= F1 \cdot t$   7.

Thus, when the comparator 2 determines that the contents L are smaller than the contents E, the contents E of the reversible counter 1 become a quadratic curve with a lapse of time and the contents L of the reversible counter 3 become linear.

The condition is imposed that the output pulse frequency $Fo$ becomes equal to the input command pulse frequency $Fi$ and the contents E are equal to the contents L. Thereafter, the input command pulse Pi must disappear.

Equations (8), (9) and (10) may be obtained as follows, from Equations (5) and (7) when $Fi$ equals $Fo$ and both the contents E and L are equal to $Fi/k$.

$E = Fi/k - \int Fo \, dt$   8.
$L = Fi/k - \int F1 \, dt$
$= Fi/k - F1 \cdot t$   9.
$Fo = Fi - k \cdot F1 \cdot t$   10.

By substituting Equation (10) for $Fo$ in Equation (8), the contents E are obtained as follows.
$E = Fi/k - Fi \cdot t + k \cdot F1 \cdot t^2/2$   11.

The foregoing process becomes true when the output signal from the comparator 2 indicates that the contents L are smaller than the contents E during acceleration and that the contents L are larger than the contents E during deceleration. As far as the other cases of the relation between the contents E of the reversible counter 1 and the contents L of the reversible counter 3 are concerned, the following two cases A and B are conceivable.

A. During acceleration,
   Repetition of the cycle of
   $E = L \rightarrow E < L \rightarrow$
   $E = L \rightarrow E < L \rightarrow E = L$
   During deceleration,
   Repetition of the cycle of
   $E = L \rightarrow E > L \rightarrow$
   $E = L \rightarrow E > L \rightarrow E = L$
B. During acceleration,
   Repetition of the cycle of
   $E = L \rightarrow E > L \rightarrow$
   $E = L \rightarrow E < L \rightarrow E = L$
   During deceleration,
   Repetition of the cycle of
   $E = L \rightarrow E < L \rightarrow$
   $E = L \rightarrow E > L \rightarrow E = L$ In a word, these examples may be said to show that the contents L follow the variation of the contents E. As for Example (A), if the delay due to the variations of the contents E and L may be ignored, the circuit of FIG. 3 may be considered to be equivalent to the circuit of FIG. 1 and the output pulse frequency $Fo$ is given by exponential function in its rising and declining periods, as shown in FIG. 2a. On the other hand, in Example (B), the linear acceleration-deceleration characteristic is converted to that of an exponential function.

Figure 4A:
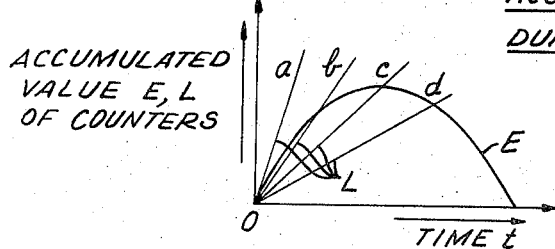
FIG. 4a is a graphical presentation of the accumulated value of the counters of the motor speed acceleration-deceleration control circuit of FIG. 3 during the acceleration.
Figure 4B:
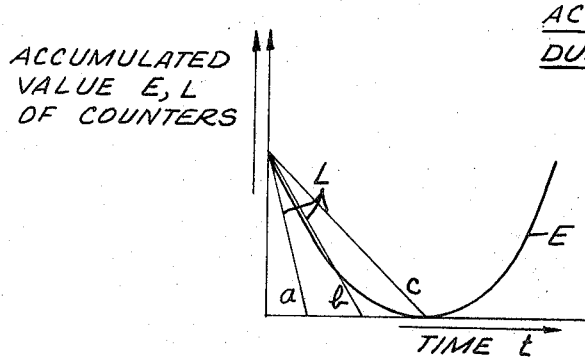
FIG. 4b is a graphical presentation of the accumulated value of the counters of the motor speed acceleration-deceleration control circuit of FIG. 3 during the deceleration.

FIGS. 4a and 4b explain in what cases the output pulse frequency Fo may be expressed in a linear or exponential function. In each of FIGS. 4a and 4b, the abscissa represents the time $t$ and the ordinate represents the accumulated value of the contents E and L of the counters. FIG. 4a shows a graph of the contents E in the reversible counter 1 and the contents L of the reversible counter 3 plotted according to Equations (6)

and (7) at the time when the output command pulse frequency Fo increases. The straight lines *a*, *b*, *c* and *d* have respectively different gradient angles F1s of the contents L in Equation (7).

Whether the characteristic of the output pulse frequency Fo becomes a linear or exponential function may be made clear by comparing the gradient of the quadratic curve E with the gradient of the straight line L at the point where the contents E becomes equal to the contents L. That is, the comparison is made when the gradient $dL/dt$ of the contents L is larger than the gradient $dE/dt$ of the contents E, the E and L repeat the foregoing condition (A). Thus, the characteristic becomes an exponential function. On the other hand, when $dL/dt$ is smaller than $dE/dt$, the characteristic may be expressed by the straight line shown in Equation (5). Further explanation is provided only for the case where the contents L of the reversible counter 3 are expressed by the straight lines *a*, *b*, *c* and *d*.

For the straight line *a*, since $dL/dt$ is larger than $dE/dt$ at the point where L becomes equal to E($t=0$), the L repeats the cycle in Example (A), trying to follow the variation of E. Therefore, the frequency Fo increases exponentially until it becomes equal to Fi.

For the straight line *b*, $dL/dt$ is smaller than $dE/dt$ at the point where L becomes equal to E($t=0$), and L crosses E at the point located on the left hand side of the peak point of the quadratic curve. At such time, since E is larger than L during the time from $t=0$ until $E=L$, Fo increases linearly according to Equation (5). At the point where E becomes equal to L, $dL/dt$ becomes larger than $dE/dt$. This condition is equivalent to that for line *a* and Fo increases exponentially until it becomes equal to Fi.

For the straight line *c*, the condition is a special case of the line *b*, and E crosses L at the peak point of the quadratic curve. When E becomes equal to L, Fo also becomes equal to Fi. Therefore, Fo always increases linearly.

For the straight line *d*, E crosses L at a point on the right hand side of the peak point of the quadratic curve. Fo increases linearly and E becomes equal to L, when Fo becomes larger than Fi.

The foregoing explanation is provided for Fo during increase, and this is true for Fo being decreased.

FIG. 4*b* shows a graph of the contents E and L plotted in accordance with Equations (9) and (11) when the output frequency Fo decreases. The straight lines *a*, *b* and *c* have different gradient F1s of L, respectively. Fo decreases exponentially in the case of line *a*, linearly and exponentially in the case of line *b*, and linearly in the case of line *c*. Thus, the acceleration-deceleration characteristic of the output pulse frequency Fo may be made linear or exponential, appropriately varying the frequency F1. In addition, how Fo, E and L vary with time, is explained with regard to the lines *a*, *b*, *c* and *d*, with the frequency F1 as the parameter.

When $F1 = Fi/2$, the condition is equivalent to the case of line *c*, as hereinbefore described. When Equation $F1 = Fi/2$ is introduced into Equations (6) and (7), E and L may be expressed as follows during the increase of Fo.

$E = -Fi \cdot k(t-2/k)^2/4 + Fi/k$  12.
$L = Fi \cdot t/2$  13.

It is apparent from Equations (12) and (13) that E becomes equal to L when $t$ is $2/k$. At this time, the relation $Fo=2F1$ may be derived from Equation (5). After stabilization, when the input pulse Pi disappears, E is abruptly decreased, allowing L to decrease gradually, since Fo is larger than Fi, which equals zero. During the decrease of Fo the following equations, concerning E and L, may be obtained from Equations (9) and (11).

$E = k \cdot Fi(t-2/k)^2/4$  14.
$L = Fi/k - Fi \cdot t/2$  15.

Figure 5A:
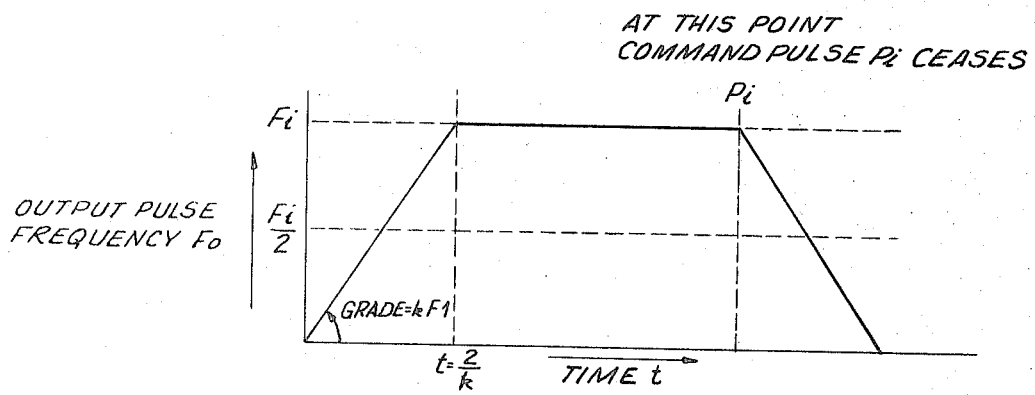
FIG. 5a is a graphical presentation of the output pulse frequency characteristic of the motor speed acceleration-deceleration control circuit of FIG. 3 having the linear acceleration-deceleration characteristic.
Figure 5B:
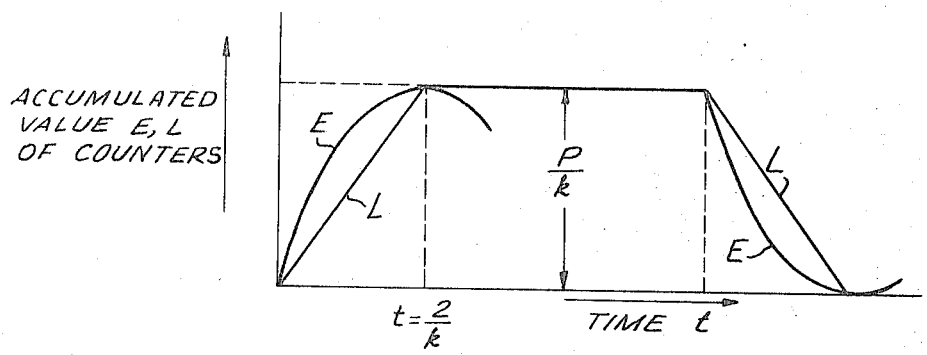
FIG. 5b is a graphical presentation of the accumulated value of the counters of the motor speed acceleration-deceleration control circuit of FIG. 3 having the linear acceleration-deceleration characteristic.

The graphs of FIGS. 5*a* and 5*b* may be obtained from Equations (5), (10), (12), (13), (14) and (15). In FIG. 5*a*, the abscissa represents the time $t$ and the ordinate represents the output pulse frequency Fo in pulses per second. In FIG. 5*b*, the abscissa represents the time $t$ and the ordinate represents the accumulated value E, L of the counters. As is clear from the foregoing, when the relation $Fi=2F1$ exists, E becomes equal to L only when Fo is equal to Fi, permitting Fo to increase linearly.

When $Fi > F1 > Fi/2$, the condition corresponds to that of line *b*, as hereinbefore described. The time when E becomes equal to L may be obtained as follows, from Equations (6) and (7).

$ta = 2(Fi-F1)/k \cdot F1$  16.

At such time, the output frequency Fo may be expressed as follows by substituting Equation (16) for $t$ in Equation (5).

$Fo = 2(Fi-F1)$  17.

Thus, the output frequency Fo increases linearly up to the value given by Equation (17), and, in accordance with Equation (18), it increases exponentially until Fo becomes equal to Fi.

$Fo=(2F1-Fi)[1-exp(-k(t-ta))] + 2(Fi-F1)$  18.

During deceleration, that is, after the input command pulse Pi disappears, the output frequency Fo varies linearly and then exponentially only when E is equal to L. This occurs when the time hereinbefore defined by Equations (9) and (11) elapses after the input pulse Pi disappears.

$ta' = ta = 2(Fi-F1)/k \cdot F1$  19.

At such time, the output frequency Fo may be obtained by introducing Equation (19) into Equation (10). That is, $Fo = (2F1-F2)$  20.

Figure 6A:
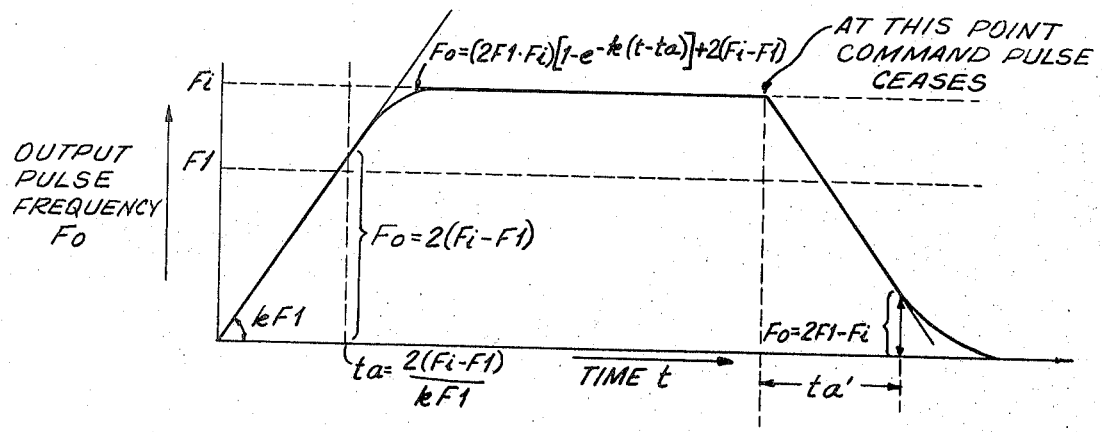
FIG. 6a is a graphical presentation of the output pulse frequency characteristic of the motor speed acceleration-deceleration control circuit of FIG. 3 when the linear acceleration-deceleration characteristic is converted into an exponential characteristic during operation.
Figure 6B:
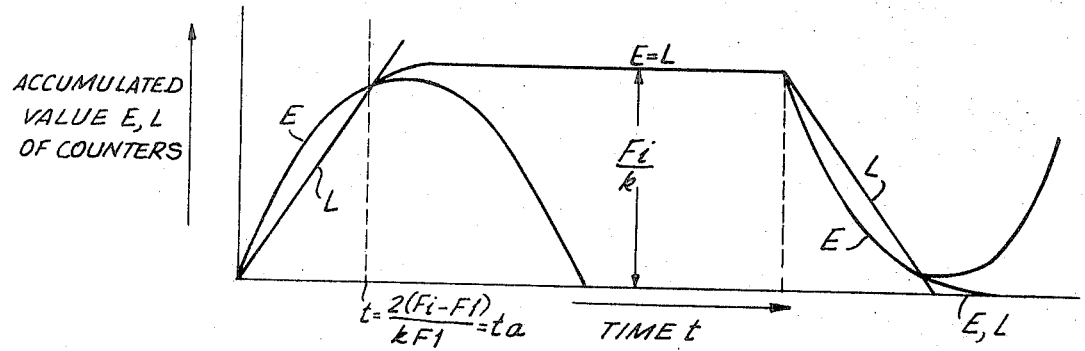
FIG. 6b is a graphical presentation of the accumulated value of the counters of the motor speed acceleration-deleleration control circuit of FIG. 3 when the linear acceleration-deceleration characteristic is converted into an exponential characteristic during operation.

Therefore, Fo decreases linearly until it reaches the value given by Equation (20) and further decreases exponentially until Fo becomes equal to zero. Fo, E and L are shown in FIGS. 6*a* and 6*b*. In each of FIGS. 6*a* and 6*b*, the abscissa represents the time $t$. In FIG. 6*a*, the ordinate represents the output pulse frequency Fo in pulses per second. In FIG. 6*b*, the ordinate represents the accumulated value E and L of the counters.

When $Fi > F1$, the condition is equivalent to that of line *a*, as hereinbefore described. The frequency Fo increases or decreases exponentially when the input pulse supplies or disappears respectively.

Figure 7A:
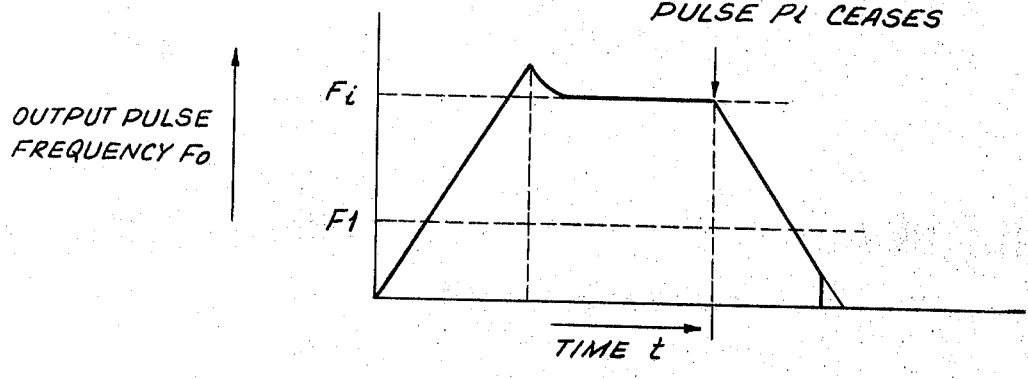
FIG. 7a is a graphical presentation of the output pulse frequency characteristic of the motor speed acceleration-deceleration control circuit of FIG. 3 having another linear acceleration-deceleration characteristic.
Figure 7B:
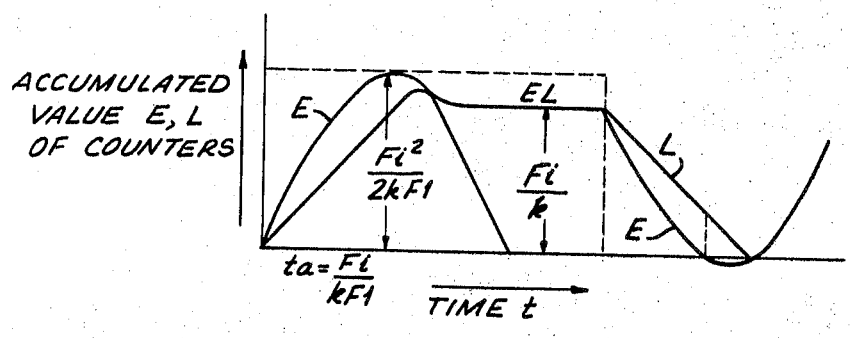
FIG. 7b is a graphical presentation of the accumulated value of the counters of the motor speed acceleration-deceleration control circuit of FIG. 3 having another linear acceleration-deceleration characteristic.

When $F1 > Fi/2$, the condition corresponds to that of line *d*, as hereinbefore described. At such time Fo, E and L are shown in FIGS. 7*a* and 7*b*. In each of FIGS. 7*a* and 7*b*, the abscissa represents the time $t$. In FIG. 7*a*, the ordinate represents the output pulse frequency Fo in pulses per second. In FIG. 7*b*, the ordinate represents the accumulated value E and L of the counters. Even when Fo becomes equal to Fi, E does not become equal to L, and Fo continues to increase, exceeding Fi until E becomes equal to L. When Fo exceeds Fi, E starts to decrease, and then E becomes equal to L. Fo increases linearly until E becomes equal to L, and decreases exponentially, and then becomes stable and equivalent to Fi. When the input command pulse Pi disappears, Fo decreases linearly and L is still left at the time of E= 0.

Figure 8C:
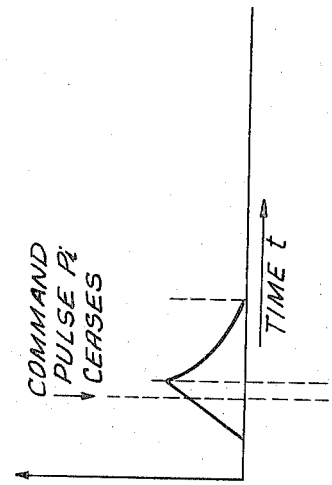
FIGS. 8a and 8c are graphical presentations of the output pulse frequency characteristic of the motor speed acceleration-deceleration control circuit of FIG. 3 when command pulses are missing before the output pulse reaches command speed.
Figure 8D:
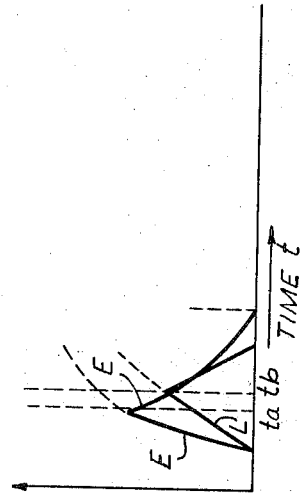
FIGS. 8b and 8d are graphical presentations of the accumulated value of the counters of the motor speed acceleration-deceleration control circuit of FIG. 3 when command pulses are missing before the output pulse reaches command speed.

In order to provide coincidence between the number of input command pulses and the output command pulses, a logic circuit which is capable of blocking the output command pulse Po when E is 0 must be provided. Some differences exist in operations when the input command pulse Pi disappears before the stable condition occurs; that is, before Fo becomes equal to Fi. These differences are explained quantitatively with regard to FIGS. 8a, 8b, 8c and 8d. In each of FIGS. 8a, 8b, 8c and 8d, the abscissa represents the time $t$. In each of FIGS. 8a and 8c, the ordinate represents the output pulse frequency Fo in pulses per second. In each of FIGS. 8b and 8d, the ordinate represents the accumulated value E and L of the counters.

Figure 8A:
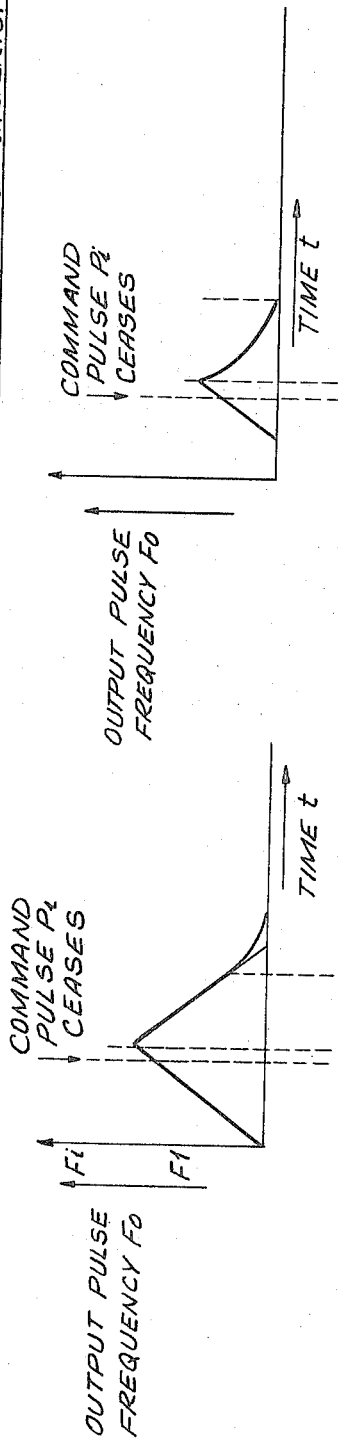

After the input command pulse Pi is supplied, L increases linearly while E increases quadratically. When the input command pulse Pi disappears and $t=ta$, Fo further increases, since E is larger than L. When E begins to increase immediately, E becomes equal to L at the time $t=tb$. At such time, the gradient $ke$ of E is larger than the gradient $kl$ of L in absolute value ($|ke| > |k1|$), Fo decreases linearly, as shown in FIG. 8a, and further decreases exponentially from the time that E again becomes equal to L.

Figure 8B:
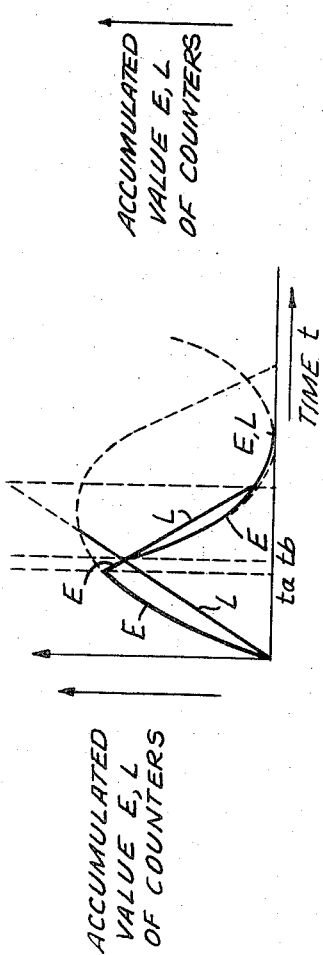

On the other hand, when $|ke| < |k1|$, Fo decreases exponentially, as shown in FIG. 8b.

Figure 9:
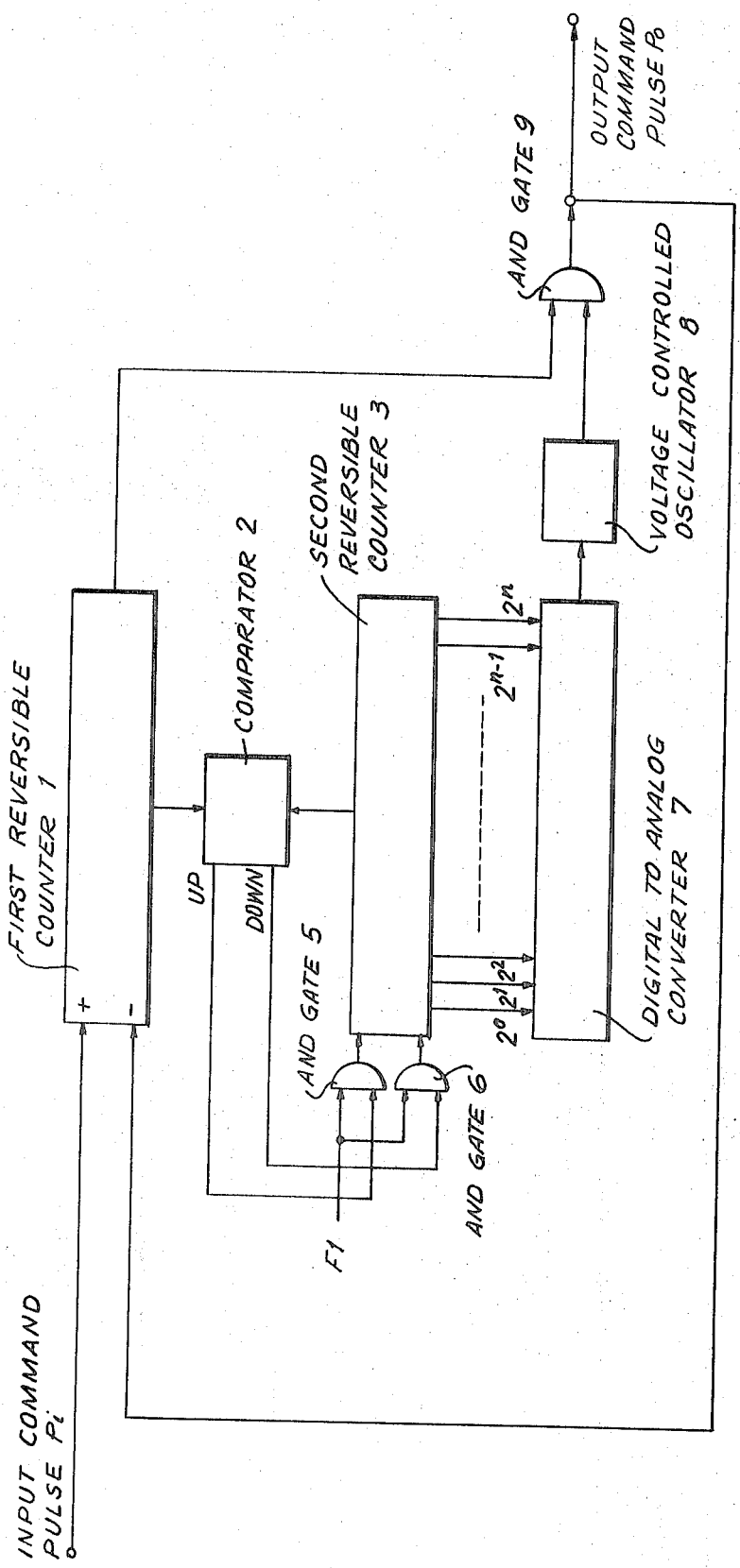
FIG. 9 is a block diagram of another embodiment of the motor speed acceleration-deceleration control circuit of the invention.

FIG. 9 shows an embodiment of the motor speed acceleration-deceleration control circuit in which the pulse generator or pulse distributor 4 of FIG. 3 is replaced by a digital to analog converter 7 and a voltage controlled oscillator 8. An AND gate 9 blocks the output pulse when the contents E of the first reversible counter 1 become specific values such as, for example, zero. $2^{0, 21}, \ldots 2^n$, respectively, denotes the output from the set inputs of the $(n+1)$ flip flop circuits which the second reversible counter 3 comprises.

FIG. 10 shows an embodiment of the motor speed acceleration-deceleration control circuit in which the MIT pulse generator 4 of FIG. 3 is replaced by a well-known digital differential analyzer DDA. As is clear from FIG. 10, the digital differential analyzer DDA comprises the second reversible counter 3. An adder 21 adds the contents L of the reversible counter 3 and those of a counter or register 22. The counter or register 22 stores the sum of the addition and sends out overflow pulses.

FIG. 11 shows the output pulse frequency Fo of the embodiment of FIG. 3 when F1 is equal to Fi/2. In FIG. 11, the abscissa represents the time $t$ and the ordinate represents the output pulse frequency Fo in pulses per second. In FIG. 11, the solid line represents the output pulse frequency Fo and the broken line represents the input pulse frequency Fi.

Figure 12:
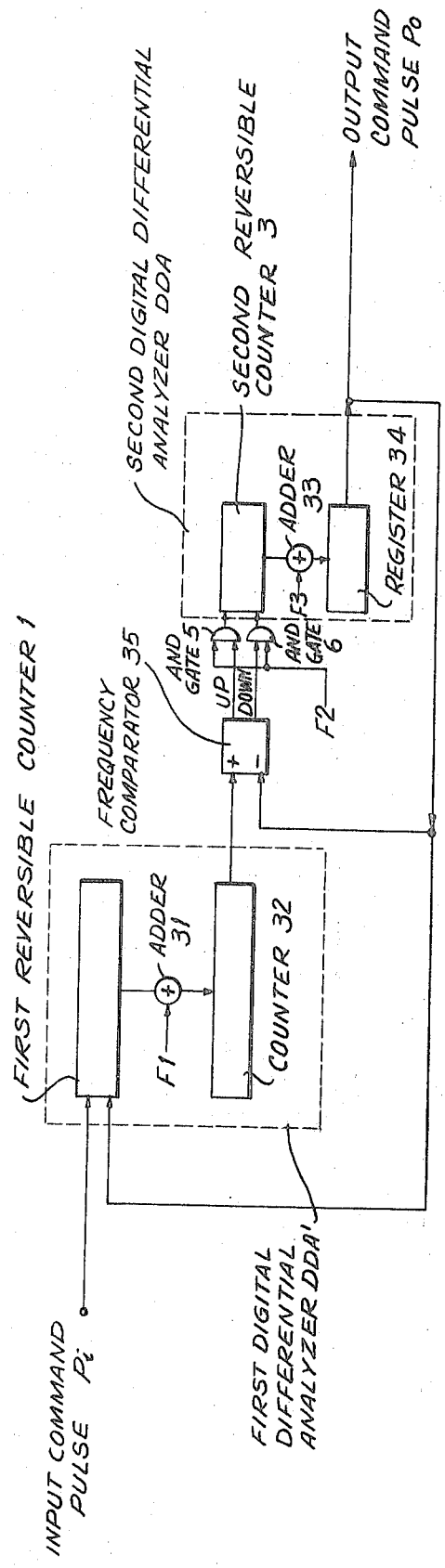
FIG. 12 is a block diagram of yet another embodiment of the motor speed acceleration-deceleration control circuit of the invention.

FIG. 12 shows another embodiment of the motor speed acceleration-deceleration control circuit of the invention. In the embodiment of FIG. 12, a first digital differential analyzer DDA' comprises the first reversible counter 1, which adds each time the input command pulse Pi is supplied and subtracts each time the output pulse Po is exhausted. An adder 31 adds the contents of a counter or register 32 and the first reversible counter 1 at an interval of 1/F1. The counter or register 32 stores the sum of the addition and sends out an overflow pulse each time the counter overflows.

The second digital differential analyzer DDA comprises the reversible counter 3 which carries out addition and subtraction of the constant frequency pulse F2 in accordance with the output from the AND gates 5 and 6. An adder 33 adds the contents in the second reversible counter 3 and a counter or register 34. The counter or register 34 stores the sum of the addition and sends out an overflow pulse each time the counter overflows.

The embodiment of FIG. 12 comprises a frequency comparator or discriminating circuit 35 which compares the overflow pulse frequency produced by the first digital differential analzyer DDA' and that produced by the second digital differential analyzer DDA and produces an output acceleration signal UP and a deceleration signal DWN. The AND gate 5 adds one to the contents of the second reversible counter 3 each time the outside constant frequency pulse F2 is supplied from an outside pulse generator (not shown in the FIGS.) when the acceleration signal UP is logic "1". The AND gate 6 subtracts one from the contents of the reversible counter 3 each time the outside constant frequency pulse F2 is supplied, when the deceleration signal DWN is logic "1".

The difference between the embodiment of FIG. 12 and those of FIGS. 3, 9 and 10, is that in FIG. 12 the input command pulse Pi is cumulatively stored, and once converted into a pulse train by the digital differential analyzer DDA'. Then, the pulse frequency is compared with the output pulse frequency by the frequency comparator 35. In other words, the comparator 2 of FIGS. 3, 9 and 10 compares the contents of the reversible counters, while the comparator 35 of FIG. 12 compares the frequencies.

Figure 13:
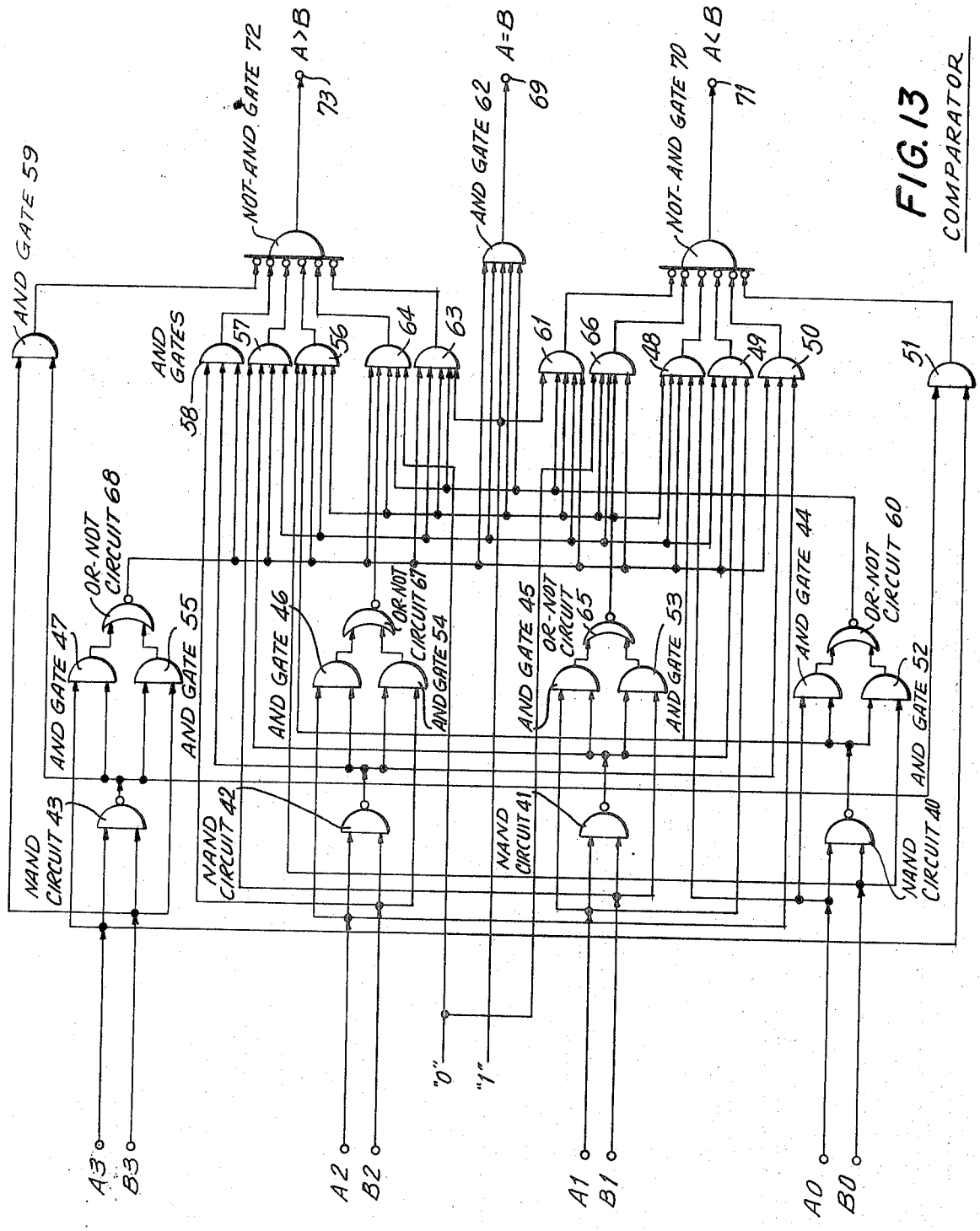
FIG. 13 is a block diagram of an embodiment of the comparator of the motor speed acceleration-deceleration control circuits of FIGS. 3, 9 and 10.

FIG. 13 shows an embodiment of the comparator 2 of the embodiments of FIGS. 3, 9 and 10. FIG. 13 comprises logic circuitry. Signals A0, A1, A2 and A3 are supplied by the first reversible counter 1 to a first input of each of NAND circuits 40, 41, 42 and 43, a first input of each of AND gates 44, 45, 46 and 47 and a first input of AND gates 48, 49, 50 and 51. Signals B0, B1, B2 and B3 are supplied by the second reversible counter 3 to the second input of each of the NAND circuits 40, 41, 42 and 43, a first input of each of AND gates 52, 53, 54 and 55 and a first input of each of AND gates 56, 57, 58 and 59.

The output of the NAND circuit 40 is connected to the second input of each of the AND gates 52 and 44, a second input of the AND gate 48 and a second input of the AND gate 56. The output of the NAND circuit 41 is connected to the second input of each of the AND gates 53 and 45, a second input of the AND gate 49 and a second input of the AND gate 57. The output of the NAND circuit 42 is connected to the second input of each of the AND gates 54 and 46, a second input of the AND gate 50 and a second input of the AND gate 58. The output of the NAND circuit 43 is connected to the second input of each of the AND gates 55 and 47, the second input of the AND gate 51 and the second input of the AND gate 59.

The outputs of the AND gates 52 and 44 are connected to inputs of an OR-NOT circuit 60 having an output connected to the first inputs of AND gates 61, 62, 63 and 64. The outputs of the AND gates 53 and 45 are connected to inputs of an OR-NOT circuit 65 having an output connected to first and second inputs of an AND gate 66, a third input of the AND gate 48, a second input of each of the AND gates 66, 61, 62 and 63 and a third input of each of the AND gates 64 and 56. The outputs of the AND gates 54 and 46 are connected to inputs of an OR-NOT circuit 67 having an output connected to a fourth input of each of AND gates 48 and 56 and a third input of each of AND gates 49, 66, 61, 62, 63, 64 and 57. The outputs of the AND gates 55 and 47 are connected to inputs of an OR-NOT circuit 68 having an output connected to the third input of each of the AND gates 50 and 58, the fourth input of each of the AND gates 49 and 57, a fourth input of each of the AND gates 66, 61, 62, 63 and 64 and the fifth input of each of the AND gates 48 and 56.

A logic "0" signal is supplied to the fifth input of each of the AND gates 66 and 64. A logic "1" signal is supplied to the fifth input of each of the AND gates 61, 62 and 63.

The output of the AND gate 62 is connected to an output terminal 69 which produces a signal when $A=B$. The outputs of the AND gates 51, 50, 49, 48, 66 and 61 are connected to inputs of a NOT-AND gate 70 having an output connected to an output terminal 71 which produces a signal when A is less than B. The outputs of the AND gates 63, 64, 56, 57, 58 and 59 are connected to inputs of a NOT-AND gate 72 having an output connected to an output terminal 73 which produces a signal when A is greater than B.

Figures 14, 17:
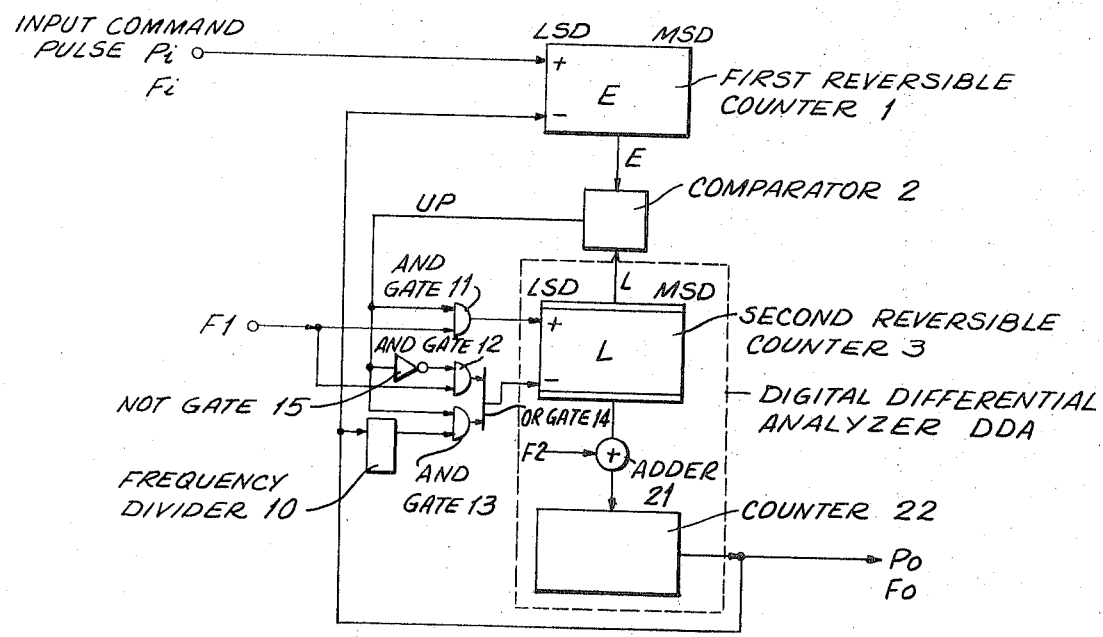
FIG. 14 is a table of logic input and output signals of the comparator of FIG. 13.
FIG. 17 is a block diagram of still another embodiment of the motor speed acceleration-deceleration control circuit of the invention having an exponential function acceleration characteristic and a linear deceleration characteristic.

FIG. 14 is a table of the logic input and output signals in the comparator of FIG. 13. The table of FIG. 14 tabulates examples of the four bit first and second reversible counters 1 and 3.

The binary E and L signals are compared in the following equations.

$$E = A3 \cdot 2^2 + A2 \cdot 2^2 + A1 \cdot 2^1 + A0 \cdot 2^0 \qquad 20a.$$
$$L = B3 \cdot 2^2 + B2 \cdot 2^2 + B1 \cdot 2^1 + B0 \cdot 2^0 \qquad 20b.$$

Figure 15:
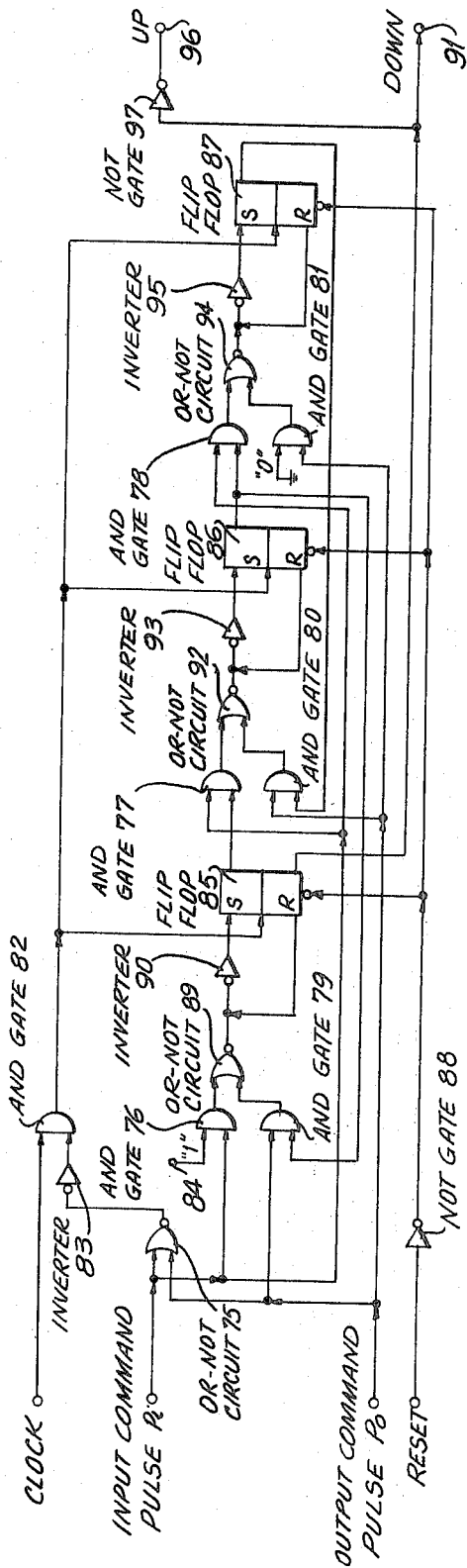
FIG. 15 is a block diagram of an embodiment of the frequency comparator of the motor speed acceleration-deceleration control circuit of FIG. 12.

FIG. 15 shows an embodiment of the frequency comparator 35 of the motor speed acceleration-deceleration control circuit of FIG. 12. FIG. 15 comprises logic circuitry. In the frequency comparator of FIG. 15, the input command pulse $Pi$ is supplied to a first input of an OR-NOT circuit 75, a first input of an AND gate 76, a first input of an AND gate 77 and a first input of an AND gate 78. The output command pulse $Po$ is supplied to the second input of the OR-NOT circuit 75, a first input of an AND gate 79, a first input of an AND gate 80 and a first input of an AND gate 81.

A clock pulse is supplied to a first input of an AND gate 82. The output of the OR-NOT circuit 75 is connected to the second input of the AND gate 82 via an inverter 83. A voltage source 84 is connected to the second input of the AND gate 76 and supplies a logic "1" signal thereto. The output of the AND gate 82 is connected to each of a plurality of flip flops 85, 86 and 87. Each of the flip flops 85, 86 and 87 has set and reset inputs and outputs. The set and reset inputs are labelled S and R, respectively.

A reset signal is supplied to the reset input R of each of the flip flops 85, 86 and 87 via a NOT gate 88. The outputs of the AND gates 76 and 79 are connected to inputs of an OR-NOT circuit 89 having an output connected to the set input S of the flip flop 85 via an inverter 90. The reset output of the flip flop 85 is also connected to the set input of said flip flop via the inverter 90.

The set output of the flip flop 85 is connected to the second input of the AND gate 77. The reset output of the flip flop 85 is connected to an output terminal 91 at which the DWN signal is provided. The outputs of the AND gates 77 and 80 are connected to inputs of an OR-NOT circuit 92 having an output connected to the set input S of the flip flop 86 via an inverter 93. The reset output of the flip flop 86 is also connected to the set input of said flip flop via the inverter 93.

The set output of the flip flop 86 is connected to the second input of each of the AND gates 79 and 78. The second input of the AND gate 81 is connected to a point at ground potential, which supplies a logic "0" signal thereto. The outputs of the AND gates 78 and 81 are connected to inputs of an OR-NOT circuit 94 having an output connected to the set input S of the flip flop 87 via an inverter 95. The reset output of the flip flop 87 is also connected to the set input of said flip flop via the inverter 95.

The set output of the flip flop 87 is connected to the second input of the AND gate 80. The reset output of the flip flop 85 is connected to an output terminal 96 via a NOT gate 97. The UP signal is provided at the output terminal 96.

When no input pulse $Pi$ is supplied, the flip flops 85, 86 and 87 are in the reset condition and the deceleration signal DWN is logic "1". Every time the input pulse $Pi$ is supplied, the flip flops 85, 86 and 87 are set in the sequence of 85, 86 and 87. Every time the output pulse Po is supplied, the flip flops 87, 86 and 85 are successively reset. The acceleration signal UP and the deceleration signal DWN respectively become logic "1" when the flip flop 85 is set and reset.

As is apparent from the operating principle of the motor speed acceleration-deceleration control circuit of FIG. 3, the output pulse frequency characteristic may be controlled linearly, exponentially, or via a combination of the linear and exponential controls, by the motor speed acceleration-deceleration control circuit of the invention.

Figure 16:
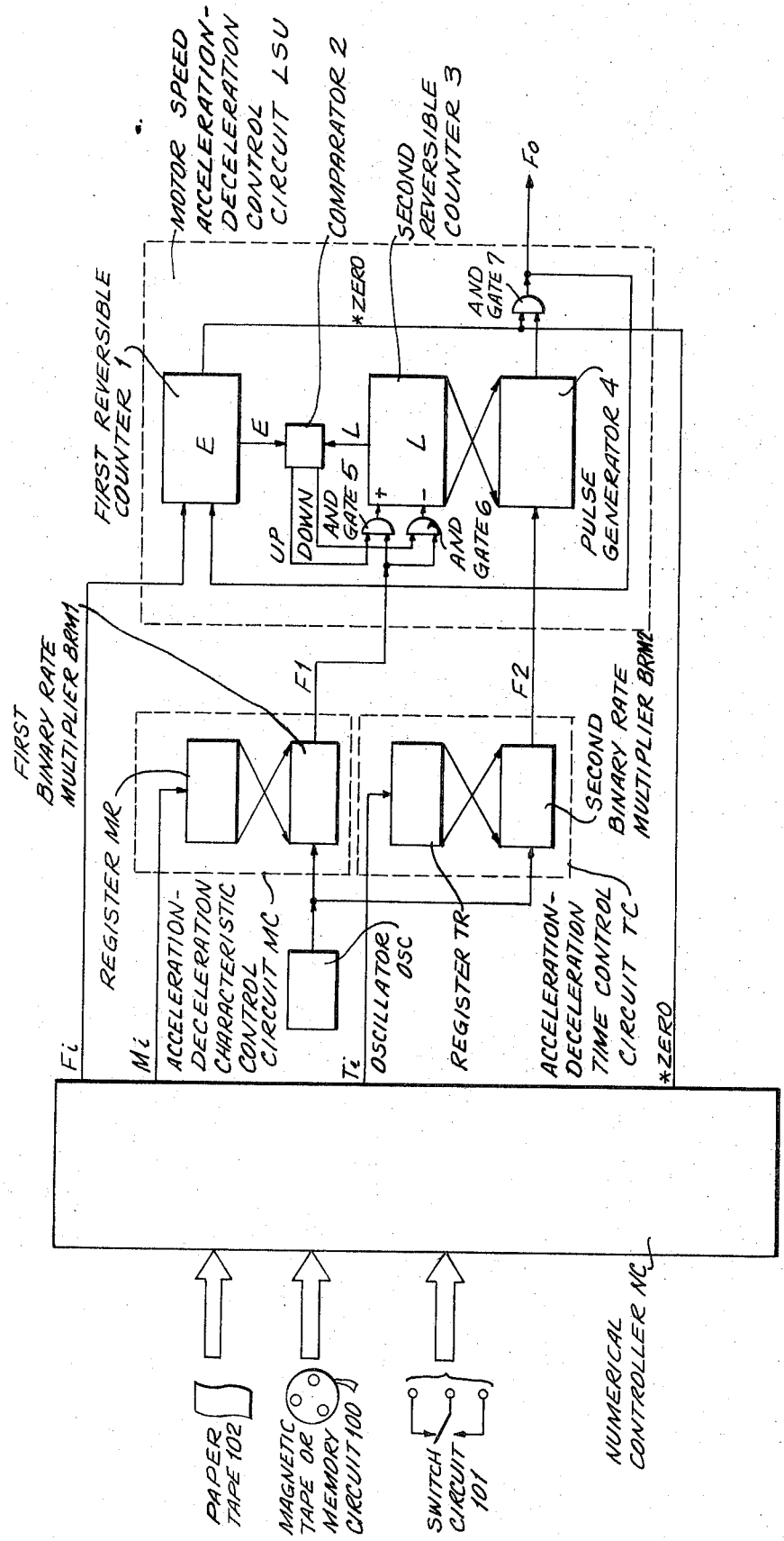
FIG. 16 is a block diagram of another embodiment of the motor speed acceleration-deceleration control circuit of the invention having variable acceleration-deceleration characteristics and variable acceleration-deceleration time.

FIG. 16 shows an embodiment of the motor speed acceleration-deceleration control circuit of the invention which enables switching of the acceleration and deceleration time and characteristics of the output pulse frequency by commands provided by a magnetic tape or memory circuit 100, a switch circuit 101 and/or a paper tape 102. The embodiment of FIG. 16 comprises a motor speed acceleration-deceleration control circuit LSU. A numerical control NC sends an acceleration-deceleration characteristics control signal $Mi$ to an acceleration-deceleration characteristic control circuit MC and an acceleration-deceleration time control signal $Ti$ to an acceleration-deceleration time control circuit TC in accordance with the command information from the paper tape 102, the magnetic tape 100 or the switch circuit 101. The pulse generation is controlled upon reception of a distribution end signal *ZERO from the motor speed acceleration-deceleration control circuit LSU.

The acceleration-deceleration characteristic control circuit MC comprises a register MR which stores the acceleration-deceleration control signal Mi and a well known first binary rate multiplier BRM1 which counts the output pulses from an oscillator OSC having a frequency of oscillation FP. The first binary rate multiplier BRM1 sends out a pulse having a frequency F1 through multiplication of the contents of the register MR and the output pulses of the oscillator OSC. The acceleration-deceleration time control circuit TC comprises a register TR, which stores the acceleration-deceleration time control signal Ti, and a second binary rate multiplier BRM2, which counts the output pulses from the oscillator OSC. The second binary rate multiplier sends out a pulse having a frequency F2 through multiplication of the contents of the register TR and the output pulses of the oscillator OSC. An AND gate 7 in the motor speed acceleration-deceleration control circuit LSU blocks the output pulse Fo when the contents of the first reversible counter 1 become specific values.

As is clear from the operating principle of the motor speed acceleration-deceleration circuit, the output frequency characteristic varies linearly, when F1 is equal to $Fi/2(F1=Fi/2)$, from linear to exponential, when $Fi > F1 > (Fi/2)$, and exponentially, when $F1 > Fi$. In addition, when the acceleration-deceleration characteristic varies linearly, the acceleration-deceleration time is given by $2/k$. Since $k=F2/2^n$, $k$ may be varied by altering F2, resulting in successful control of the acceleration-deceleration time. Therefore, when a motor which drives machine tools is controlled by the motor speed acceleration-deceleration control circuit of the invention, the acceleration-deceleration time of each motor may be set individually. The acceleration-deceleration time at fast feed and cutting may also be set individually. Furthermore, the linearity of the acceleration-deceleration characteristic is free from any influences if the acceleration-deceleration time is switched after confirming that the contents of the first reversible counter 1 become a specific value such as, for example, zero.

FIG. 17 shows an embodiment of the motor speed acceleration-deceleration circuit of the invention having an exponential pulse acceleration characteristic and a linear deceleration characteristic. It is generally well known that the speed-torque characteristic during the deceleration time exceeds that during acceleration by several times under the condition that a load is applied to the pulse motor. The pulse motor may therefore respond easier to the speed characteristic, which shows a linear characteristic during deceleration and a gradual exponential characteristic during acceleration. The motor speed acceleration-deceleration control circuit of FIG. 17 is used to drive a pulse motor of such type.

FIG. 17 comprises the first reversible counter 1, which advances by +1 each time the input pulse Pi, having a frequency of Fi pulses per second is supplied and subtracts each time the output pulse Po having a frequency of Fo pulses per second is produced. The second reversible counter 3 reversibly counts the pulses of fixed frequency F1 supplied from an outside oscillator (not shown in the FIGS.), in accordance with the output signals from AND gates 11 and 12. The second reversible counter 3 subtracts the contents in accordance with the output signal from an AND gate 13 each time a frequency divider 10 supplies a pulse. This divides the frequency of the output pulse by one half.

The comparator 2 compares the contents E of the first reversible counter 1 and the contents L of the second reversible counter 3 and supplies the signal UP to the AND gates 11 and 13 and to an AND gate 12 via a NOT gate 15 when E is larger than L. The AND gate 11 advances the counter 3 by +1 each time a pulse having a frequency $F1(=Fi/2)$ is supplied from the outside, when E is larger than L. The NOT gate 15 produces a logic "1" output signal when E is less than or equal to L. The AND gate 12 subtracts one from the contents L of the counter 3 when the NOT gate 15 produces a logic "1" signal and a fixed frequency pulse $F1(=Fi/2)$ is supplied from the outside. The AND gate 13 subtracts one from the contents L of the counter 3 each time a pulse is supplied from the frequency divider 10, when E is larger than L.

An OR gate 14 is connected to the subtraction input of the reversible counter 3. An input signal is supplied to the OR gate 14 from the AND gate 12 and the AND gate 13. The adder 21 adds the contents L of the second reversible counter 3 and the contents of the counter or register 22 each time a fixed frequency pulse F2 is supplied from outside. The counter 22 stores the sum of the addition and sends out the output pulse Po each time said counter overflows. The well known digital differential analyzer DDA comprises the second reversible counter 3, the adder 21 and the counter 22.

The operation of the embodiment of FIG. 17 of the invention is hereinafter explained.

When the input pulse Pi rises, E is larger than L and the comparator 2 produces a logic "1" signal. Thus, the accumulated values E(t) of the first reversible counter 1, the accumulated values L(t) of the second reversible counter 3 and the output pulse frequency Fo are shown by Equations (21), (22) and (23).

$$E(t) = Fi \cdot t - \int_0^t Fo\, dt \qquad (21)$$

$$L(t) = Fi \cdot t/2 - \int_0^t Fo\, dt/2 \qquad (22)$$

$$Fo(t) = L(t) \cdot F2/2^n \qquad \qquad 23.$$
$$= k \cdot L(t)$$

wherein $k$ is the gain and is defined by $k=F2/2^n$ and $n$ is the number of bits in the counter.

E(t), L(t) and Fo (t) may be transformed into Equations (24), (25) and (26), from Equations (21), (22) and (23).

$$E(t) = 2Fi(1-exp(-kt/2))/k \qquad 24.$$
$$L(t) = Fi(1-exp(-kt/2))/k \qquad 25.$$
$$Fo(t) = Fi(1-exp(-kt/2)) \qquad 26.$$

Equations (24) and (25) prove that $L(t)$ is one half $E(t)$.

When the input pulse Pi disappears and the output pulse Po falls below the stable condition, E(t) is larger than L(t) within a certain time after the input pulse Pi disappears. After the passage of a specified period of time, as hereinbefore indicated, the relation E(t) is less than or equal to L(t) is maintained until the contents E(t) of the first reversible counter 1 become zero.

Until $E(t)$ becomes equal to $L(t)$, $Fo$, $E$ and $L$ are of the following values. During the time that $E(t)$ is larger than $L(t)$, the frequency of the output pulse $Po$ is constant and the values of $Fo(t)$ and $L(t)$ are given by Equations (27), (28) and (29) during the time until the input pulse $Pi$ disappears and $E(t)$ is less than or almost equal to $L(t)$.

$Fo = Fi \ldots$ constant  (27.)

$E(t) = 2Fi/k - \int Fo\,dt$ $= 2Fi/k - Fi \cdot t$  (28.)

$L(t) = Fi/k$  (29.)

The time $tEL$, from the disappearance of the input pulse $Pi$ until $E(t)$ becomes equal to $L(t)$, may be expressed as follows from Equations (28) and (29).

$tEL = 1/k$  (29a.)

After $E(t)$ becomes equal to $L(t)$, the values of $Fo$, $E$ and $L$ are determined as follows. When the subtraction frequency $Fo$ of the first reversible counter is compared with the subtraction frequency $F1(=Fi/2)$ of the second reversible counter, when $E(t)$ is equal to $L(t)$, it is apparent that $Fo$ is larger than $Fi/2$, since $Fo$ is equal to $Fi$ at such time. The decreasing rate of $E(t)$ is therefore larger than that of $L(t)$.

When $E(t)$ is equal to $L(t)$, the following equation may be obtained.

$|dE/dt| > |dL/dt|$  (30.)

$E(t)$, $L(t)$ and $Fo(t)$ may be expressed by Equations (31), (32) and (33), when both $E(t)$ and $L(t)$ are indicated by $Fo/k$ when $E(t)=L(t)$.

$E(t) = Fi/k - \int Fo\,dt$  (31.)

$L(t) = Fi/k - Fi \cdot t/2$  (32.)

$Fo(t) = k \cdot L(t)$  (33.)

$E(t)$ and $Fo(t)$ may be further transformed from Equations (31) and (33) as follows.

$E(t) = k \cdot Fi(t-2/k)^2/4$  (34.)

$Fo(t) = Fi - k \cdot Fi \cdot t/2$  (35.)

Equations (32) and (34) indicated that both $E(t)$ and $L(t)$ become zero within a period $2/k$ after $E(t)$ becomes equal to $L(t)$, but not zero.

Figure 18A:
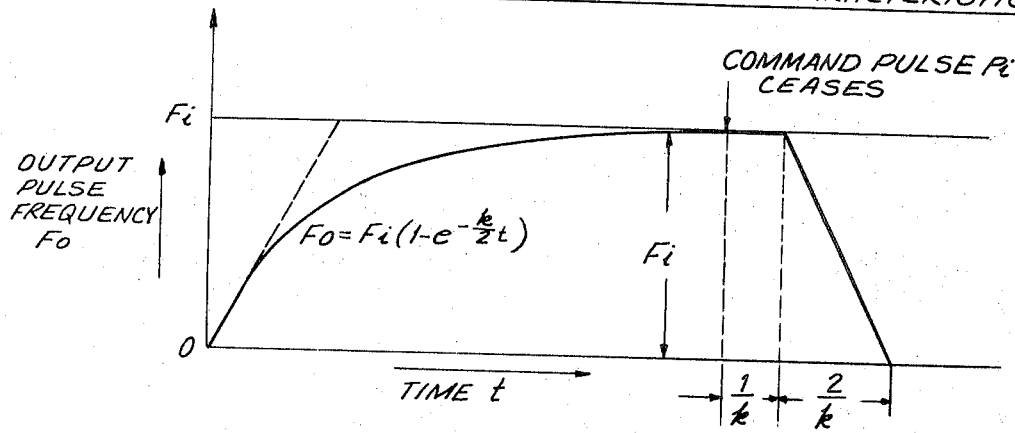
FIG. 18a is a graphical presentation of the output pulse frequency characteristic of the motor speed acceleration-deceleration control circuit of FIG. 17.
Figure 18B:
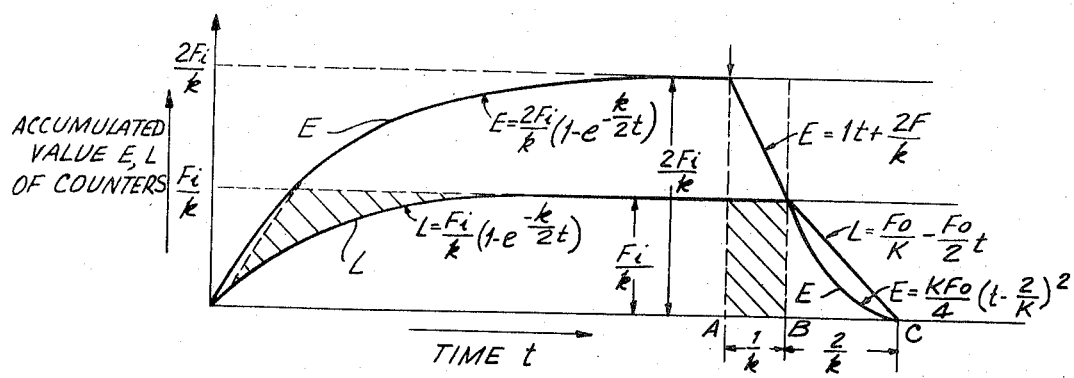
FIG. 18b is a graphical presentation of the accumulated value of counters of the motor speed acceleration-deceleration control circuit of FIG. 17.

FIGS. 18a and 18b illustrate the foregoing considerations. In each of FIGS. 18a and 18b, the abscissa represents the time $t$. In FIG. 18a, the ordinate represents the output frequency $Fo$ in pulses per second. In FIG. 18b, the ordinate represents the accumulated value $E$ and $L$ of the counters.

When the input pulse $Pi$ disappears before reaching its stable condition, $Fo(t)$, $E(t)$ and $L(t)$ are as shown in FIGS. 19a, 19b, 19c and 19d. In each of FIGS. 19a, 19b, 19c and 19d, the abscissa represents the time $t$. In each of FIGS. 19a and 19c, the ordinate represents the output pulse frequency $Fo$ in pulses per second. In each of FIGS. 19b and 19d, the ordinate represents the accumulated value $E$ and $L$ of the counters. When the input pulse $Pi$ ceases at the time $ta$, $E(t)$ is larger than $L(t)$ until $E(t)$ becomes equal to $L(t)$. Under these conditions, $E(t)$ is indicated by Equation (36) and $L(t)$ and $Fo(t)$ are indicated by Equations (32) and (33), respectively.

$$E(t) = E(ta) - \int_0^t Fo(t)\,dt \quad (36)$$

Equations (22), (23) and (36) may be utilized to further transform $E(t)$ into Equation (37).

$E(t) = E(ta) - Fi(t+2exp(-kt/2)/k-2/k)$  (37.)

Figure 19A:
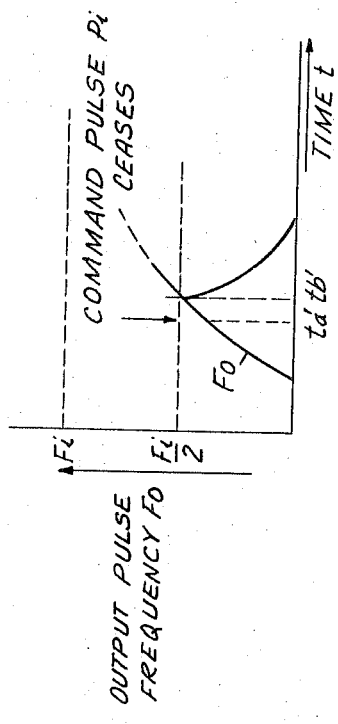
FIGS. 19a and 19c are graphical presentations of the output pulse frequency characteristic of the motor speed acceleration-deceleration control circuit of FIG. 17 when command pulses are missing before the output pulse reaches command speed.
Figure 19C:
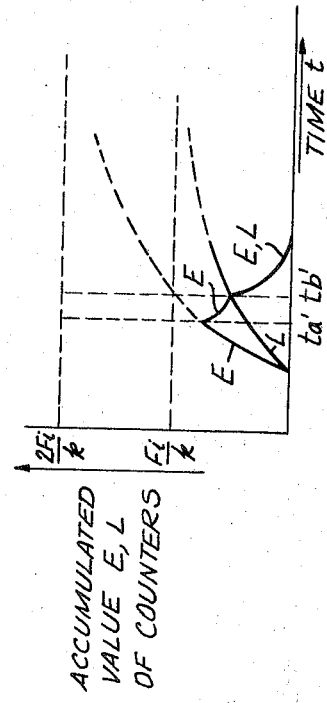
Figure 19B:
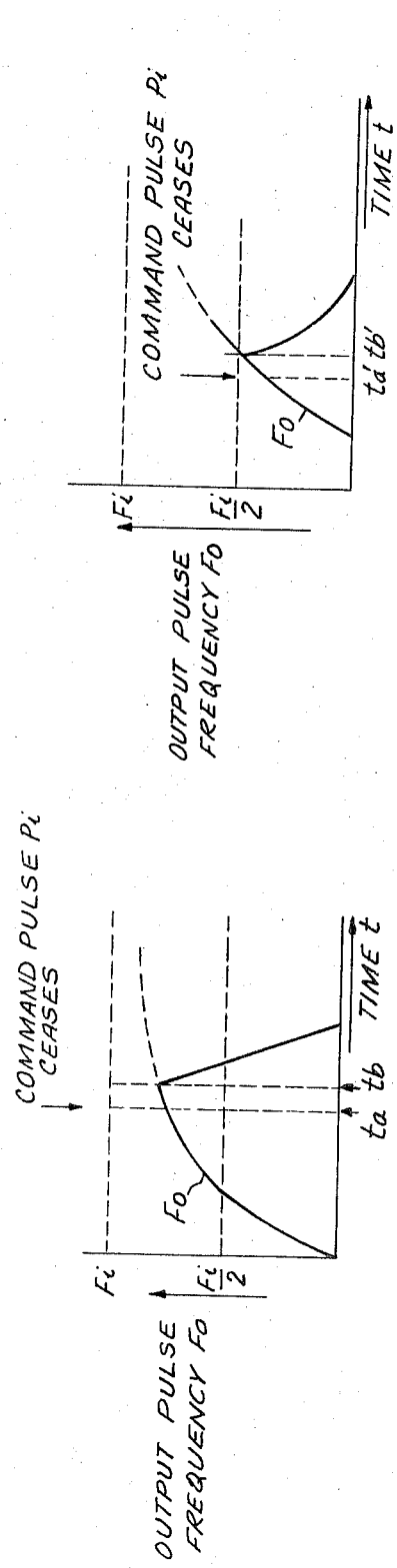
FIGS. 19b and 19d are graphical presentations of the accumulated value of counters of the motor speed acceleration-deceleration control circuit of FIG. 17 when command pulses are missing before the output pulse reaches command speed.
Figure 19D:
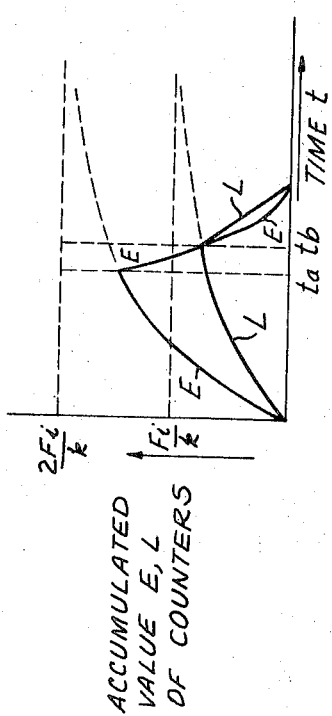

$E$ becomes equal to $L$ at the time $tb$, and the same operation is repeated as in the period until $E(t)$ becomes equal to $L(t)$. That is, since $Fo$ is greater than $Fi/2$ at the time $tb$ when $E(t)$ becomes equal to $L(t)$, $E(t)$ immediately begins to decrease in accordance with a quadratic function and $L(t)$ decreases linearly (FIGS. 19a and 19b). When $Fo$ is smaller than $Fi/2$ at the time $tb$, for example, after the rise time, the input pulse $Pi$ ceases within a comparatively short period of time. The operation $E=L \rightarrow E>L \rightarrow E=L \rightarrow E>L$ is repeated, and $Fo$ decreases exponentially rather than linearly (FIGS. 19c and 19d).

Figure 20A:
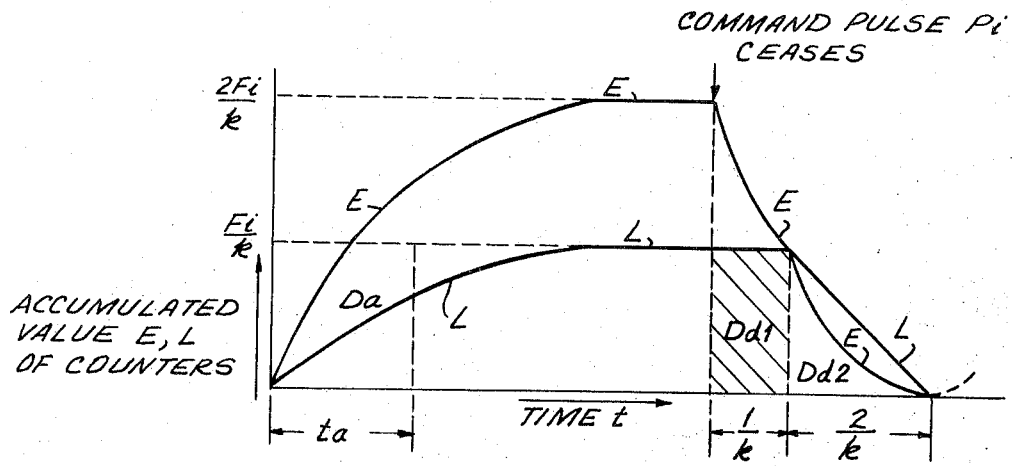
FIG. 20a is a graphical presentation of the accumulated value of counters of the motor speed acceleration-deceleration control circuit of FIG. 17.
Figure 20B:
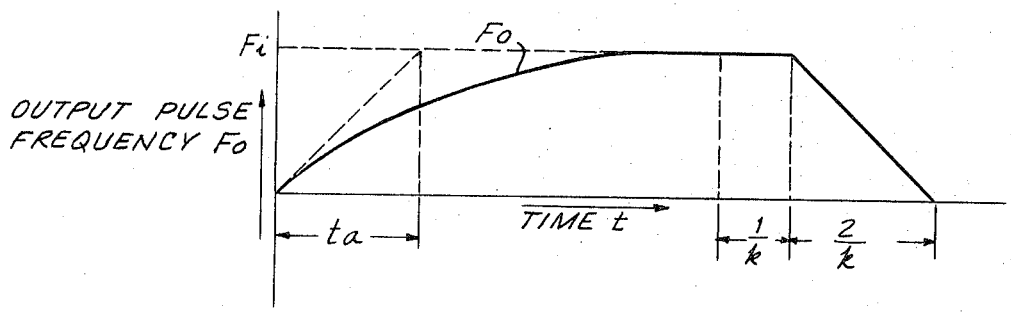
FIG. 20b is a graphical presentation of the output pulse frequency characteristic of the motor speed acceleration-deceleration control circuit of FIG. 17.

FIGS. 20a and 20b show the accumulated values of the second reversible counter 3 of the embodiment of FIG. 17 of the motor speed control circuit of the invention. In each of FIGS. 20a and 20b, the abscissa represents the time $t$. In FIG. 20a, the ordinate represents the accumulated value $E$ and $L$ of the counters. In FIG. 20b, the ordinate represents the output pulse frequency $Fo$ in pulses per second.

The accumulated values $Da$ of the second reversible counter 3 during the period from the input of the input pulse $Pi$ until the stable condition is attained, is given by Equation (38).

$$Da = \int_0^\infty (Fi/k - <(t))\,dt$$

$$Da = \int_0^\infty Fi\,\exp(-kt/2)/k\,dt$$

$$= 2Fi/k^2 \quad (38)$$

The accumulated value $Ddl$ of the second reversible counter 3, accumulated during the period from the cessation of the input pulse $Pi$ until $L(t)$ becomes equal to $E(t)$, and the accumulated value $Dd2$ of said counter, accumulated during the period from $L(t)=E(t) \neq 0$ until $E(t)=L(t)=0$ are indicated as follows.

$Dd1 = Fi/k^2$  (38a.)

$Dd2 = Fi/k^2$  (38b.)

The following relations may be obtained.

$Dd1 = Dd2$  (38c.)

$Dd1 + Dd2 = Da$  (38d.)

FIG. 21 shows an embodiment of the motor speed acceleration-deceleration control circuit of the invention in which the embodiment of FIG. 10 is expanded to reduce the deceleration time when an urgent stop signal is provided. The motor speed control circuit of FIG. 21 comprises the first reversible counter 1, which adds each time the input pulse $Pi$ appears and subtracts each time the output pulse $Po$ is provided or the fixed frequency pulse F3 is supplied from outside the circuit when an urgent stop signal LS having a magnitude of logic "1" is supplied to an input of the AND gate 13 via a NOT gates 105 and 16. The second reversible counter 3 reversibly counts the fixed frequency pulses F1 and F3 supplied from outside the circuit in accordance with the outputs of the AND gates 11, 12 and 13.

The comparator or discriminator 2 compares the contents E of the first reversible counter 1 with the contents L of the second reversible counter 3 and produces an output signal UP which is supplied to an input of the AND gate 11 and to an input of the AND gate 12 via the NOT gate 15, when E > L. The NOT gate 15 provides a logic "1" signal to inputs of the AND gates 12 and 13 when E is less than or equal to L. The AND gate 12 subtracts one from the contents of the second reversible counter 3 when the NOT gate 15 provides a logic "1" signal and a fixed frequency pulse F1 is supplied from outside. The AND gate 13 subtracts one from the contents of the second reversible counter 3 each time the fixed frequency pulse F3 is supplied from outside, when the NOT gate 16 provides a logic "1" signal and an urgent stop signal LS of magnitude logic "1" is supplied to the circuit.

An AND gate 17 blocks the input pulse Pi when an urgent stop signal LS of magnitude logic "1" is supplied to the circuit. The AND gate 11 adds one to the contents of the second reversible counter 3 each time a fixed frequency pulse F1 is supplied, when E is greater than L. An OR gate 18 provides logical addition for the output pulse Po and the output signal provided by the AND gate 13. The OR gate 14 provides logical addition for the output signal provided by the AND gate 13 and the output signal of the AND gate 12 and supplies the results to the subtraction input of the second reversible counter 3. The adder 21 adds the contents of the second reversible counter 3 and the counter or register 22 each time a fixed frequency pulse F2 is supplied from outside the circuit. The counter 22 stores the sum of the addition and provides the output pulse Po each time said counter overflows.

The well known digital differential analyzer DDA comprises the second reversible counter 3, the adder 21 and the counter 22.

When there is no urgent stop signal LS, said signal has a magnitude of logic "0".

The output pulse frequency $Fo(t)$, $E(t)$ and $L(t)$ are derived from Equations (5), (6), (7), (9), (10) and (11) as follows, during the acceleration and deceleration of the input pulse Pi.

When $F1=Fi/2$ and during acceleration,
$Fo(t) = k \cdot Fi \cdot t/2$  39.
$E(t) = Fi \cdot t - k \cdot Fi \cdot t^2/4$  40.
$L(t) = Fi \cdot t/2$  41.

When $F1=Fi/2$ and during deceleration,
$Fo(t) = Fi - k \cdot Fi \cdot t/2$  42.
$E(t) = Fi/4 - Fi \cdot t + (k \cdot Fi \cdot t^2)/4$  43.
$L(t) = Fi/k - Fi \cdot t/2$  44.

When the urgent stop signal LS has a magnitude of logic "1" during stable conditions, the input pulse Pi is immediately interrupted and the contents of the reversible counters 1 and 3 are subtracted each time the fixed frequency pulse F3 is supplied from outside the circuit. $Fo(t)$, $E(t)$ and $L(t)$ are expressed as follows.
$Fo(t) = Fi - k \cdot F3 \cdot t$  45.
$E(t) = Fi/k - F3 \cdot t$  46.
$L(t) = Fi/k - F3 \cdot t$  47.

Therefore, the deceleration time which brings $Fo(t)$ equal to zero is determined by $Fi/kF3$ after the urgent stop signal LS is provided. This is indicated by equation (45). Under normal conditions, when an urgent stop signal LS is not provided, the deceleration time is indicated by $2/k$ from Equation (42). Therefore, immediate deceleration during the occurrence of the urgent stop signal LS is possible if $Fi/F3$ is less than 2. This is illustrated in FIGS. 22a and 22b. In each of FIGS. 22a and 22b, the abscissa represents the time t and the ordinate represents the output pulse frequency Fo in pulses per second.

Figure 23:
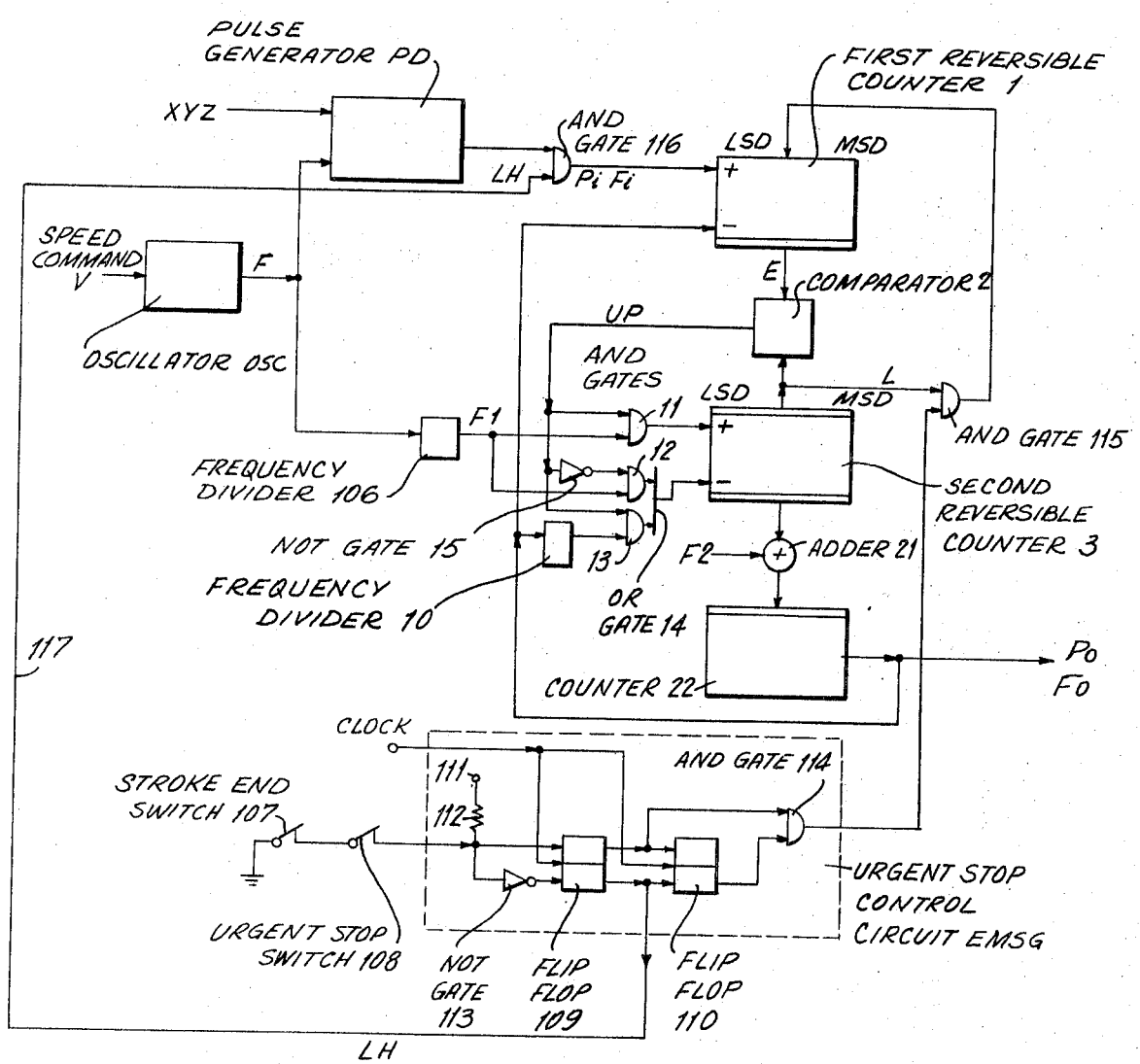
FIG. 23 is a block diagram of another embodiment of the motor speed acceleration-deceleration control circuit of the invention for reducing the deceleration time by producing a stop signal such as a stroke end signal for a machine tool or an urgent stop signal.

FIG. 23 shows an embodiment of the motor speed acceleration-deceleration control circuit of the invention in which the embodiment of FIG. 17 is expanded to reduce the deceleration time when an urgent stop signal is provided. The circuit of FIG. 23 provides an exponential pulse frequency characteristic during acceleration and a linear characteristic during deceleration.

In the embodiment of FIG. 23, an oscillator OSC varies the frequency of oscillation F in accordance with a speed command V. A pulse generator or distributor PD permits travelling length command magnitudes X, Y and Z and output pulses from the oscillator OSC to be utilized as the input signal and produces the input pulse Pi each time the oscillator provides an output pulse, until the number of input pulses becomes equivalent to the travelling length command magnitudes. A frequency divider 106 divides the frequency of the output pulse of the oscillator OSC in half.

A stroke end switch 107 and an urgent stop switch 108 are provided in series connection between a point at ground potential and an urgent stop control circuit EMSG. The urgent stop control circuit EMSG comprises a pair of flip flops 109 and 110, each having a set input, a set output, a reset input and a reset output. A clock pulse is supplied to each flip flop 109 and 110. The urgent stop switch 108 is connected to the set input of the flip flop 109, to a source of voltage 111 via a resistor 112 and to the reset input of the flip flop 109 via a NOT gate 113.

The set output of the flip flop 109 is connected to a first input of an AND gate 114 and to the set input of the flip flop 110. The reset output of the flip flop 110 is connected to the second input of the AND gate 114. The output of the AND gate 114 is connected to a first input of an AND gate 115. The output of the second reversible counter 3 connected to an input of the comparator 2 is also connected to the second input of the AND gate 115. The output of the AND gate 115 is connected to an input of the first reversible counter 1.

The AND gate 115 shifts the contents of the second reversible counter 3 into the first reversible counter 1. An AND gate 116 has an input counnected to the output of the pulse generator PD and an output connected to the addition input of the first reversible counter 1. The AND gate 116 blocks the input pulse Pi when there is an urgent stop signal.

The contacts of the stroke end switch 107 are normally closed. The flip flops 109 and 110 of the urgent stop control circuit EMSG are thus reset by supplying a logic "0" signal at ground potential to said urgent stop control circuit. When there is a stroke end or urgent stop condition, the contacts of the stroke end switch 107 or the urgent stop switch 108 open. This causes the flip flop 109 to be set by the positive voltage of logic "1" magnitude applied from the voltage source 111 to the set input of said flip flop via the resistor 112.

At such time, the reset output of the flip flop 109 provides a logic "0" signal.

The logic "0" reset output signal of the flip flop 109 switches the AND gate 116 to its non-conductive condition, due to a connection between the reset output of the flip flop 109 and the second input of said AND gate via a lead 117. The AND gate 116 thus prevents the input pulse Pi from entering the addition input of the first reversible counter 1. The AND gate 115 is conductive only during the supply of the clock pulse, so that the contents L of the second reversible counter 3 are shifted in parallel to the first reversible counter 1 due to the output signal provided by the AND gate 114 of the urgent stop control circuit EMSG. When there is no urgent stop signal, the circuit of FIG. 23 functions identically to the circuit of FIG. 17.

Thus, the travelling distance D of a tool such as, for example, a cutting tool, and the time td until the tool stops are as hereinafter described, if there is an urgent stop signal. When there is an urgent stop signal, the contents of the second reversible counter 3 are in the first reversible counter 1. E therefore immediately becomes equal to L. Simultaneously, the signal LH in the lead 117 becomes logic "0" in magnitude and the input pulse Pi is prevented from entering the first reversible counter 1. Thus, E becomes almost equal to L, but smaller than L from such instant, and deceleration commences immediately, as shown in FIG. 24b. In each of FIGS. 24a and 24b, the abscissa represents the time t and the ordinate represents the accumulated values E and L of the counters.

The travelling distance D may be obtained as follows.

$$D = Dd2 = Fi/k^2 \qquad 48.$$

This is half the travelling distance of $2Fi/k^2$, as indicated by Equation (38), if the tool travels after the cessation of the command pulse. The time td until the tool stops equals $2/k$. This is usually two-third the time required by the tool for stopping after the cessation of the command pulse. As hereinbefore mentioned, the tool may be stopped immediately when an urgent stop signal is provided in the embodiment of FIG. 23.

While the invention has been described by means of specific examples and in specific embodiments, we do not wish to be limited thereto, for obvious modifications will occur to those skilled in the art without departing from the spirit and scope of the invention.

We claim:

1. A motor speed acceleration-deceleration control circuit, comprising
    input command pulse supply means for supplying input command pulses;
    first reversible counter means connected to the pulse supply means for accumulating input command pulses supplied by the pulse supply means;
    second reversible counter means;
    comparator means connected to the first and second reversible counter means for comparing the contents of said first and second reversible counter means and having an output and providing an output signal at the output in accordance with the result of the comparison;
    gate means connected between the output of the comparator means and the second reversible counter means for increasing and decreasing the contents of said second reversible counter means in accordance with the output signal of the comparator means;
    pulse generating means connected to the second reversible counter means for producing output pulses having a frequency proportional to the contents of said second reversible counter means, said pulse generating means having an output and providing output command pulses at its output; and
    negative feedback means connected between the output of the pulse generating means and the first reversible counter means.

2. A motor speed acceleration-deceleration control circuit as claimed in claim 1, further comprising a first pulse generator coupled to the second reversible counter means via the gate means for supplying fixed frequency pulses, the gate means supplying a positive pulse to the second reversible counter means in the presence of a fixed frequency pulse when the contents of the first reversible counter means are larger than the contents of the second reversible counter means and supplying a negative pulse to the second reversible counter means in the presence of a fixed frequency pulse when the contents of the first reversible counter means are less than the contents of the second reversible counter means.

3. A motor speed acceleration-deceleration control circuit as claimed in claim 2, comprising first frequency variable means for varying the frequency of pulses produced by the first pulse generator thereby varying the acceleration-deceleration characteristics of output pulses produced by the pulse generating means.

4. A motor speed acceleration-deceleration control circuit as claimed in claim 1, wherein the pulse generating means comprises digital to analog converter means connected to the second reversible counter means for converting the contents of the second reversible counter means into a proportional analog voltage and a voltage controlled oscillator connected to the digital to analog converter means for providing the output pulses.

5. A motor speed acceleration-deceleration control circuit as claimed in claim 1, wherein the pulse generating means comprises a second pulse generator for producing fixed frequency pulses, the second reversible counter means and digital to pulse frequency converting means for producing pulses having a frequency proportional to the product of the frequency of the pulses produced by the second pulse generator and the contents of the second reversible counter means.

6. A motor speed acceleration-deceleration control circuit as claimed in claim 4, further comprising second frequency variable means for varying the frequency of pulses produced by the second pulse generator thereby varying the acceleration-deceleration time of output pulses produced by the pulse generating means.

7. A motor speed acceleration-deceleration control circuit, comprising
    input command pulse supply means for supplying input command pulses;
    first reversible counter means connected to the pulse supply means for accumulating input command pulses supplied by the pulse supply means;
    first pulse generating means coupled to the first reversible counter means for producing pulses having a frequency proportional to the contents of the first reversible counter means;
    second reversible counter means;

second pulse generating means coupled to the second reversible counter means for producing output pulses having a frequency proportional to the contents of the second reversible counter means;

comparator means connected to the first and second pulse generating means for comparing the frequency of pulses produced by the first pulse generating means with the frequency of output pulses produced by the second pulse generating means and having outputs and providing an output signal at the outputs in accordance with the result of the comparison;

gate means connected between the outputs of the comparator means and the second reversible counter means for increasing and decreasing the contents of the second reversible counter means in accordance with the output signal of the comparator means; and negative feedback means connected between the second pulse generating means and the first reversible counter means.

8. A motor speed acceleration-deceleration control circuit, comprising input command pulse supply means for supplying input command pulses;

first reversible counter means connected to the pulse supply means for accumulating input command pulses supplied by the pulse supply means;

second reversible counter means;

comparator means connected to the first and second reversible counter means for comparing the contents of the first and second reversible counter means and having an output and providing an output signal at the output in accordance with the result of the comparison;

gate means connected between the output of the comparator means and the second reversible counter means for increasing and decreasing the contents of said second reversible counter means in accordance with the output signal of the comparator means;

pulse generating means connected to the second reversible counter means for producing output pulses having a frequency proportional to the contents of said second reversible counter means, said pulse generating means having an output and providing output command pulses at its output;

frequency dividing means for dividing a frequency in half;

first negative feedback means connected between the output of the pulse generating means and the first reversible counter means; and second negative feedback means coupled between the output of the pulse generating means and the second reversible counter means via the frequency dividing means and the gate means for feeding back output pulses to the second reversible counter means when the contents of the first reversible counter means are greater than the contents of the second reversible counter means.

9. A motor speed acceleration-deceleration control circuit as claimed in claim 8, comprising a first pulse generator for producing fixed frequency pulses coupled to the second reversible counter means via the gate means, wherein the gate means supplying a positive pulse to the second reversible counter means in the presence of a fixed frequency pulse when the contents of the first reversible counter means are larger than the contents of the second reversible counter means and supplying a negative pulse to the second reversible counter means in the presence of a fixed frequency pulse when the contents of the first reversible counter means are less than the contents of the second reversible counter means.

10. A motor speed acceleration-deceleration control circuit as claimed in claim 8, wherein the pulse generating means comprises a second pulse generator for producing fixed frequency pulses, the second reversible counter means and digital to pulse frequency converting means for producing pulses having a frequency proportional to the product of the frequency of the pulses produced by the second pulse generator and the contents of the second reversible counter means.

11. A motor speed acceleration-deceleration control circuit as claimed in claim 10, further comprising urgent stop signal producing means for producing an urgent stop signal, a third pulse generator and means coupling the third pulse generator to the first reversible counter means for subtracting one from the contents of the first reversible counter means each time the third pulse generator produces a pulse during the production of an urgent stop signal by the urgent stop signal producing means.

12. A motor speed acceleration-deceleration control circuit as claimed in claim 8, further comprising transfer means connected to the urgent stop signal producing means and to the first and second reversible counter means for shifting the contents of the second reversible counter means into the first reversible counter means upon the production of an urgent stop signal by the urgent stop signal producing means.

* * * * *